(12) United States Patent
Tagome et al.

(10) Patent No.: US 8,497,648 B2
(45) Date of Patent: Jul. 30, 2013

(54) SYNCHRONOUS ELECTRIC MOTOR DRIVE SYSTEM

(75) Inventors: Masaki Tagome, Osaka (JP); Noriyoshi Nishiyama, Osaka (JP); Yasuhiro Kondo, Osaka (JP); Makoto Kitabatake, Nara (JP); Shun Kazama, Osaka (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 12/934,968

(22) PCT Filed: May 29, 2009

(86) PCT No.: PCT/JP2009/002392
§ 371 (c)(1),
(2), (4) Date: Sep. 27, 2010

(87) PCT Pub. No.: WO2009/144957
PCT Pub. Date: Dec. 3, 2009

(65) Prior Publication Data
US 2011/0057591 A1    Mar. 10, 2011

(30) Foreign Application Priority Data
May 30, 2008    (JP) ................................ 2008-142800

(51) Int. Cl.
*H02P 6/10*    (2006.01)
(52) U.S. Cl.
USPC ............. 318/400.41; 318/400.23; 318/400.26
(58) Field of Classification Search
USPC ............. 318/400.23, 400.26, 400.34, 400.41, 318/538; 310/112, 126, 156.01, 12.18, 12.21, 310/179, 254.1
See application file for complete search history.

(56) References Cited

U.S. PATENT DOCUMENTS

| | | | |
|---|---|---|---|
| 4,426,611 A * | 1/1984 | Espelage et al. | 318/803 |
| 5,883,484 A | 3/1999 | Akao | |
| 6,844,699 B2 * | 1/2005 | Arimitsu et al. | 318/801 |
| 7,439,697 B2 * | 10/2008 | Miyazaki et al. | 318/400.41 |
| 7,659,686 B2 | 2/2010 | Osada et al. | |
| 8,002,056 B2 * | 8/2011 | Chakrabarti et al. | 180/65.22 |
| 2007/0120520 A1 | 5/2007 | Miyazaki et al. | |

FOREIGN PATENT DOCUMENTS

| | | |
|---|---|---|
| JP | 10-066383 | 3/1998 |
| JP | 2004-064837 | 2/2004 |
| JP | 2005-039932 | 2/2005 |
| JP | 2007-51366 | 6/2007 |
| JP | 2007-151366 | 6/2007 |
| JP | 2007-259644 | 10/2007 |
| JP | 2008-043046 | 2/2008 |
| JP | 2008-092739 | 4/2008 |

* cited by examiner

*Primary Examiner* — Bentsu Ro

(57) ABSTRACT

The present invention provides a synchronous motor drive system designed to realize reduced vibration and noise along with high output. The system includes: inverters 101, 102, and 103 for converting a direct current to a three-phase alternating current; a current application control unit 52 that controls operations of the three-phase inverters; and a synchronous motor 41 driven by three-phase alternating currents supplied from the three-phase inverters. The current application control unit 52 determines, for each three-phase inverter, a current phase angle and a current amount of a three-phase alternating current to output, and each inverter supplies a three-phase alternating current having the determined current phase angle and current amount to a different one of three-phase coil groups 200*a* to 200*c*.

45 Claims, 30 Drawing Sheets

FIG. 22

Torque map table indicating torque in correspondence with current amount and current phase as parameters Current phase (deg)

| | | ... | −20 | −10 | 0 | +10 | +20 | ... |
|---|---|---|---|---|---|---|---|---|
| | 0 | ... | 0.0 | 0.0 | 0.0 | 0.0 | 0.0 | ... |
| | 10 | ... | 0.1 | 0.1 | 0.1 | 0.1 | 0.2 | ... |
| | 20 | ... | 0.1 | 0.1 | 0.2 | 0.2 | 0.3 | ... |
| Current amount (%) | ⋮ | ⋮ | ⋮ | ⋮ | ⋮ | ⋮ | ⋮ | ⋮ |
| | 60 | ... | 0.4 | 0.5 | 0.6 | 0.7 | 0.8 | ... |
| | ⋮ | ⋮ | ⋮ | ⋮ | ⋮ | ⋮ | ⋮ | ⋮ |
| | 80 | ... | 0.6 | 0.7 | 0.8 | 0.9 | 1.0 | ... |
| | 90 | ... | 0.7 | 0.8 | 0.9 | 1.0 | 1.1 | ... |
| | 100 | ... | 0.8 | 0.9 | 1.0 | 1.1 | 1.2 | ... | ary aim, one aspect of
SYNCHRONOUS ELECTRIC MOTOR DRIVE SYSTEM

TECHNICAL FIELD

The present invention relates to a synchronous motor drive system, and in particular to a technique for controlling inverters that supply drive current to a synchronous motor.

BACKGROUND ART

A synchronous motor is supplied with a three-phase alternating current from an inverter and rotates the rotor by causing the stator to generate magnetic fields by letting the current flow to coils mounted on the stator. A driving system of the synchronous motor flexibly controls the driving of the rotor by controlling the current applied to the coils appropriately in accordance with positions of magnetic poles of the rotor.

However, torque generated by the synchronous motor is not kept constant and ripples periodically. This is due to the structure of magnetic circuits mainly determined by shapes of the stator and the rotor, as well as a current waveform of the current applied to the coils. The torque ripple is composed of ripple components each having a different period. Generally speaking, a ripple component having a period of 60 electrical degrees is prominent. It is known that the periodicity of torque components varies according to shapes of the stator and the rotor, namely, a combination of the number of slots of the stator and the number of magnetic poles of the rotor. It is also known that the torque ripples emerge as a result of the current waveform deviating from a sinusoidal pattern.

Meanwhile, a recent development of power electronics technologies has resulted in broader use of synchronous motors. It is becoming popular to adopt synchronous motors driven by an alternating current to a vehicle motor using DC power supply. The use of synchronous motors in vehicles, such as a hybrid electrical vehicle and an electrical vehicle, strongly requires a further progress of output power and performance (i.e. reduced vibration and noise) and cost reduction of a motor drive system. Further, in the use in vehicles, along with high reliability, a failsafe mechanism is required so as to prevent catastrophic results due to a possible partial malfunction of the synchronous motor system.

For example, Patent Document 1 discloses a motor drive system for increasing voltage applied to an inverter and a motor by providing a boost circuit between a DC power supply and the inverter. Since an output power of a motor increases in proportion to the applied voltage, the increase in the voltage through a boost operation of the boost circuit leads to an increase in the output power of the motor.

CITATION LIST

Patent Literature

Patent Literature 1: Japanese patent application publication No. 10-66383

SUMMARY OF INVENTION

Technical Problem

However, applying a high voltage to increase output power of the motor brings about the following consequences. First, a rotation speed of the motor is increased, and accordingly an electrical frequency of the current to be applied is also increased. The increase in the electrical frequency also leads to an increase in switching frequency required in the inverter. However, it is difficult to generate an ideal sinusoidal current waveform for the inverter in which switching devices perform high-frequency switching operations, if a time constant determined by multipliers (i.e. an inductance and a coil resistance) of elements in the motor is greater than a certain degree.

In particular, a motor for driving a vehicle has a high torque and a high output power, and therefore often has a large time constant. In this case, there arises a problem that a desired current waveform cannot be obtained and a distorted current waveform is produced. As a result, higher torque ripple is generated in the motor, thus making the problem of vibration and noise more apparent.

In view of above, the present invention aims to provide a synchronous motor drive system that is capable of reducing vibration and noise while maintaining high output power.

Solution to Problem

In order to achieve the above-mentioned aim, one aspect of the present invention is a synchronous motor drive system, comprising three-phase inverters each operable to convert a direct current to a three-phase alternating current; a current application control unit operable to control operations of the three-phase inverters; and a synchronous motor operable to drive by three-phase alternating currents supplied from the three-phase inverters, wherein the synchronous motor includes: three-phase coil groups each supplied with a three-phase alternating current from one of the inverters; a rotor that has magnetic poles distributed circumferentially along a rotation direction of the rotor at equal intervals; and a stator on which stator coils are arranged circumferentially along the rotation direction of the rotor, each stator coil wound by concentrated winding and belonging to one of the three-phase coil groups, wherein every M consecutive stator coils belong to one of stator coil groups arranged at equal intervals, M being an integer two or greater, at least two consecutive stator coils in each stator coil group are arranged at an interval different from the intervals of the magnetic poles of the rotor and belong to different three-phase coil groups, the current application control unit determines, for each three-phase inverter, a current phase angle and a current amount of a three-phase alternating current to output, and each inverter supplies a three-phase alternating current having the determined current phase angle and current amount to a different one of the three-phase coil groups.

Furthermore, in order to achieve the above-mentioned aim, another aspect of the present invention is a synchronous motor drive system, comprising: three-phase inverters each operable to convert a direct current to a three-phase alternating current; a current application control unit operable to control operations of the three-phase inverters; and a synchronous motor operable to drive by three-phase alternating currents supplied from the three-phase inverters, wherein the synchronous motor includes: three-phase coil groups each supplied with a three-phase alternating current from one of the inverters; a rotor that has magnetic poles distributed circumferentially along a rotation direction of the rotor at equal intervals; and a stator that has stator teeth arranged circumferentially along the rotation direction of the rotor, and every M consecutive stator teeth belong to one of stator teeth groups arranged at equal intervals, M being an integer three or greater, at least two of consecutive first, second, and third stator teeth in each stator teeth group are arranged at an interval different from the intervals of the magnetic poles of the rotor, the first stator tooth is wound with part of a first stator coil, the third stator tooth is wound with part of a second stator coil, the second stator tooth is wound with a remaining part of the first stator coil and a remaining part of the second stator coil, and the first and second stator coils belong to different three-phase coil groups, wherein the current application control unit determines, for each three-phase inverter, a current phase angle and a current amount of a three-phase alternating current to output, and each inverter supplies a three-phase alternating current having the determined current phase angle and current amount to a different one of the three-phase coil groups.

The current phase angle mentioned above is an angle between a q-axis and an interlinkage flux direction of a rotating magnetic field in a d-q rotating coordinate system that is static with respect to the rotor of the synchronous motor.

Advantageous Effects of Invention

With the structure described in Solution to Problem, the synchronous motor drive system pertaining to the present invention causes each three-phase inverter to supply current to a different coil group to rotate the synchronous motor. Accordingly, in the synchronous motor drive system of the present invention, induced field voltages produced by rotation of the synchronous motor may be divided in the three-phase inverters, thereby realizing high output power without boosting the voltage from the DC power supply by means of the boost circuit. Further, it is not necessary to apply a high voltage to the three-phase inverters and the motor. Due to this, there is no need to use switching devices having high breakdown voltage characteristics in the three-phase inverters. This prevents degradation of inverter efficiencies, such as an increase of on-state voltage caused by the use of the switching device having high breakdown voltage characteristics and an increase of switching losses caused by the high voltage switching operation. This also prevents an increase of iron losses in the synchronous motor caused by an application of high voltage. Moreover, in the synchronous motor mentioned above, coils are separately wound for each phase, and synchronous motor is driven by the same number of the three-phase inverters as the number of coils of the same phase. Consequently, the time constant as described above is small. In other words, even when the motor rotates at a high speed, a desired current waveform with a little distortion is obtained and torque ripple is fully reduced. Furthermore, each three-phase inverter may supply a three-phase alternating current having a different current phase angle and a different current amount. Accordingly, torque ripples generated in the plurality of coils are off set so that the generated torque ripples are cancelled by each other. As a result, a torque ripple generated in the motor drive as a whole is suppressed.

Accordingly, the synchronous motor drive system of the present invention reduces vibration and noise while maintaining high output power.

Furthermore, the current phase angle differences among the plurality of three-phase inverters are varied as determined by a current application control unit. Accordingly, the synchronous motor drive system allows the synchronous motor to drive at optimal current phase angle differences, without deliberately equalizing inductances between each coil at the time of the design of the motor or even without reducing the inequality in inductances due to a manufacturing error and such. Also, in the synchronous motor drive system pertaining to the present invention, optimal flux weakening control is executed in accordance with the changes in inductances that accompany the changes in drive state of the motor.

BRIEF DESCRIPTION OF DRAWINGS

FIG. 5A shows the positional relation in a certain state; FIG. 5B shows the positional relation in the state in which the rotor 2 has been rotated by 2 mechanical degrees (i.e. Π/9 electrical radians) anti-clockwise from the state shown in FIG. 5A; FIG. 5C shows the positional relation in the state in which the rotor 2 has been rotated by 2 mechanical degrees (i.e. Π/9 electrical radians) anti-clockwise from the state shown in FIG. 5B.

FIG. 17A shows the positional relation in a certain state; FIG. 17B shows the positional relation in the state in which the rotor 2 has been rotated by 2 mechanical degrees (i.e. Π/9 electrical radians) anti-clockwise from the state shown in FIG. 17A; FIG. 17C shows the positional relation in the state in which the rotor 2 has been rotated by 2 mechanical degrees (i.e. Π/9 electrical radians) anti-clockwise from the state shown in FIG. 17B.

FIG. 22 shows an example of map data table indicating torque values in correspondence with various current amounts and current phases, which are normalized with respect to a standard torque value corresponding to a current amount of 100%- and a current phase of 0 degree.

DESCRIPTION OF EMBODIMENTS

Detailed description of preferred embodiments of a synchronous motor system of the present invention will be described below, with reference to figures.

First Embodiment

Figure 1:
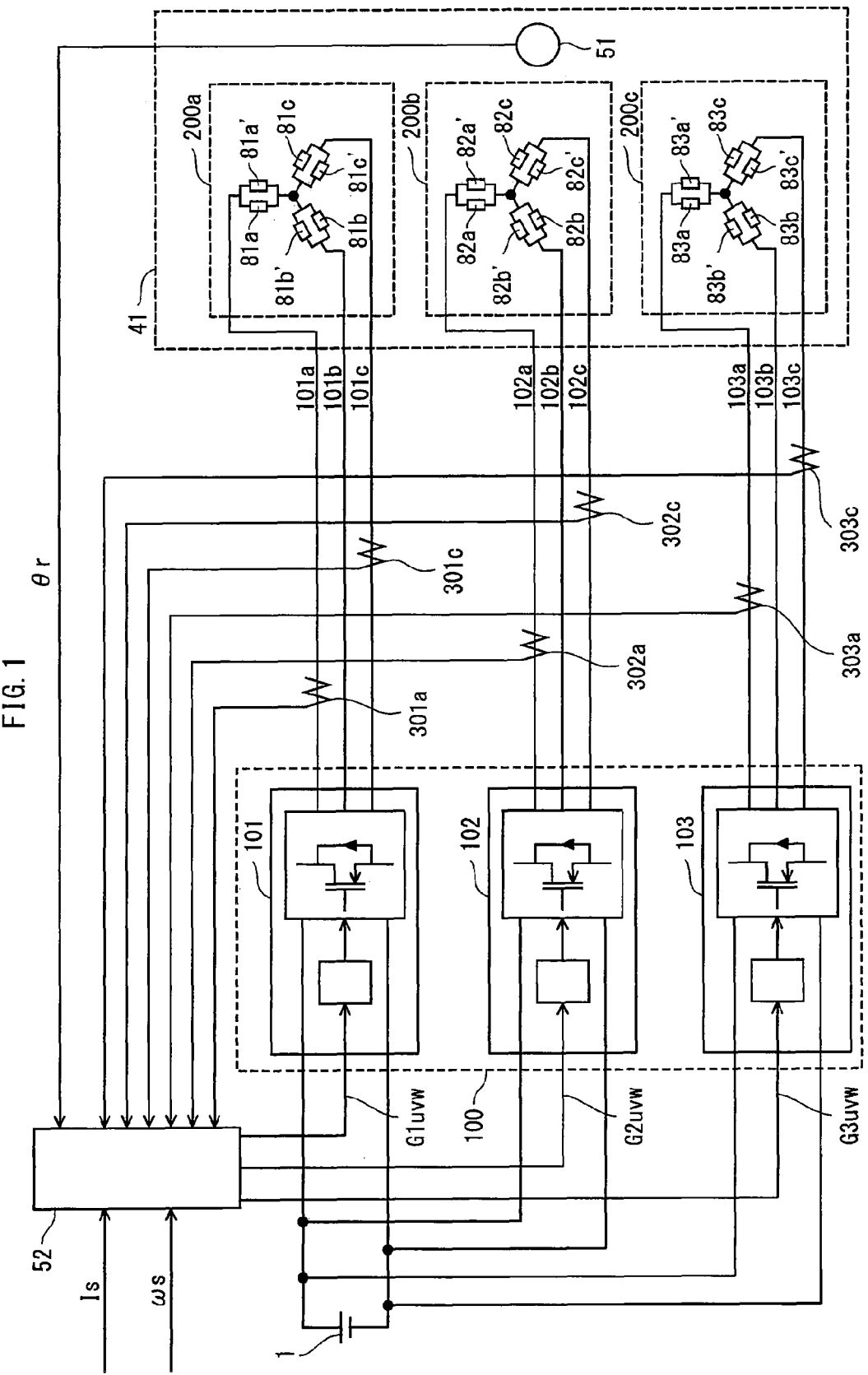
FIG. 1 shows an overall structure of the synchronous motor drive system pertaining to a first embodiment of the present invention.

Firstly, a description is made of an overall structure of a synchronous motor drive system pertaining to the present invention. FIG. 1 shows the overall structure of the synchronous motor drive system of the present invention.

The synchronous motor drive system internally includes a DC power supply 1, an inverter module 100, a synchronous motor 41, and a current application control unit 52.

The inverter module 100 has inverters 101, 102, and 103, that perform DC/AC conversion according to gate control signals G1$uvw$, G2$uvw$, and G3$uvw$, respectively, to supply three-phase currents to the synchronous motor 41. Note that the inverter module 100 is characterized in that it accommodates all constituent switching devices of the inverters 101, 102, and 103 in one. The output currents 101$a$, 101$b$, and 101$c$ from the inverter 101 are offset from each other by 2Π/3 radians. Such an offset also applies to the output currents 102$a$, 102$b$, and 102$c$ from the inverter 102 and the output currents 103$a$, 103$b$, and 103$c$ from the inverter 103.

The synchronous motor 41 includes coil groups 200$a$, 200$b$, and 200$c$. The coil group 200$a$ is composed of three-phase coils 81$a$ and 81$a'$, 81$b$ and 81$b'$, and 81$c$ and 81$c'$, to which the output currents 101$a$, 101$b$, and 101$c$ are respectively input. The coil group 200$b$ is composed of three-phase coils 82$a$, 82$a'$, 82$b$, 82$b'$, 82$c$, and 82$c'$, to which the output currents 102$a$, 102$b$, and 102$c$ are respectively input. The coil group 200C is composed of three-phase coils 83$a$, 83$a'$, 83$b$, 83$b'$, 83$c$, and 83$c'$, to which the output currents 103$a$, 103$b$, and 103$c$ are respectively input. The currents are supplied from the inverter 101 to the coil group 200$a$ via power wirings that are provided with a current detector 301$a$ for detecting a u-phase current and a current detector 301$c$ for detecting a w-phase current. Currents are supplied from the inverter 102 to the coil group 200$b$ via power wirings that are provided with a current detector 302$a$ for detecting a u-phase current and a current detector 302$c$ for detecting a w-phase current. Currents are supplied from the inverter 103 to the coil group 200$c$ via power wirings that are provided with a current detector 303$a$ for detecting a u-phase current and a current detector 303$c$ for detecting a w-phase current. Further, the synchronous motor 41 includes a position detector 51 for detecting the position of the rotor. The position detector 51 outputs a position detection signal θr to the current application control unit 52.

The current application control unit 52 is a microcomputer system that controls operations of the inverters 101, 102, and 103 by outputting thereto the gate control signals G1$uvw$, G2$uvw$, and G3$uvw$. More specifically, the following two signals are input to the current application control unit 52. One is a current command signal Is that instructs the synchronous motor 41 to drive at a desired torque amount. The other is a rotation speed command signal ωr that instructs the synchronous motor 41 to drive at a desired rotation speed. A ROM in the current application control unit 52 holds a plurality of map data tables in correspondence with the inverters 101, 102, and 103. Each map data table indicates three-phase alternating currents that the current application unit 52 causes the corresponding inverter to output in response to various values of the current command signal Is and the rotation speed command signal ωr. Each three-phase alternating current is indicated in correspondence with a current phase angle β and a current amount Ia. The current application control unit 52 determines, for each of the inverters 101, 102, and 103, the current phase angle β and the current amount Ia in response to the current command signal Is and the rotation speed command signal ωr input thereto, by referring to the map data tables. The current application control unit 52 then outputs the gate control signals G1$uvw$, G2$uvw$, and G3$uvw$ so that each inverter outputs the three-phase alternating current having the determined current phase angle β and the determined current amount Ia, while monitoring the position of the rotor and the current value in each power wiring.

This concludes the description of the overall structure of the synchronous motor system of the present invention.

Next, description is made of the synchronous motor 41.

Figure 2:
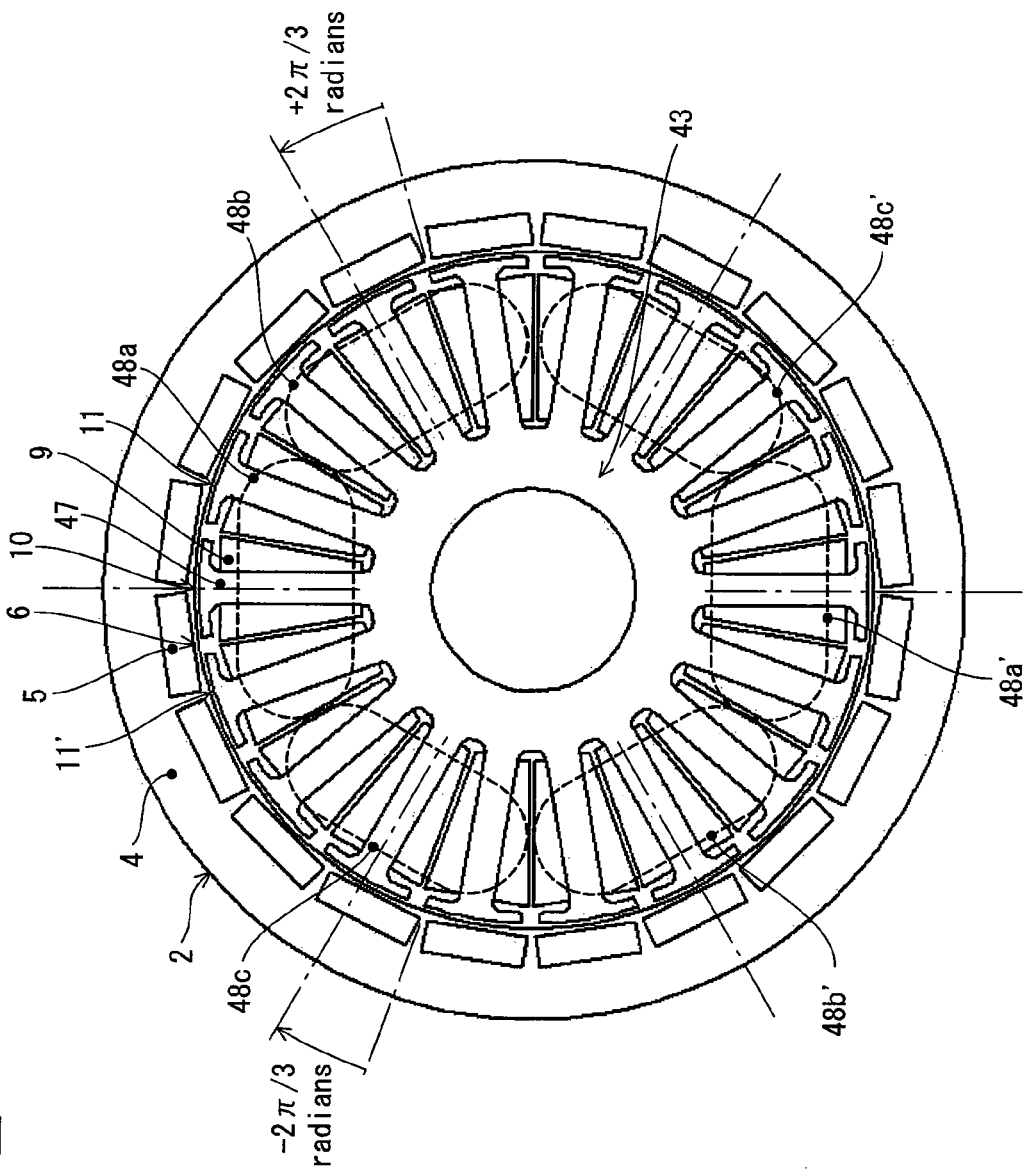
FIG. 2 is a plan view showing a synchronous motor included in the synchronous motor drive system pertaining to the first embodiment of the present invention
Figure 3:
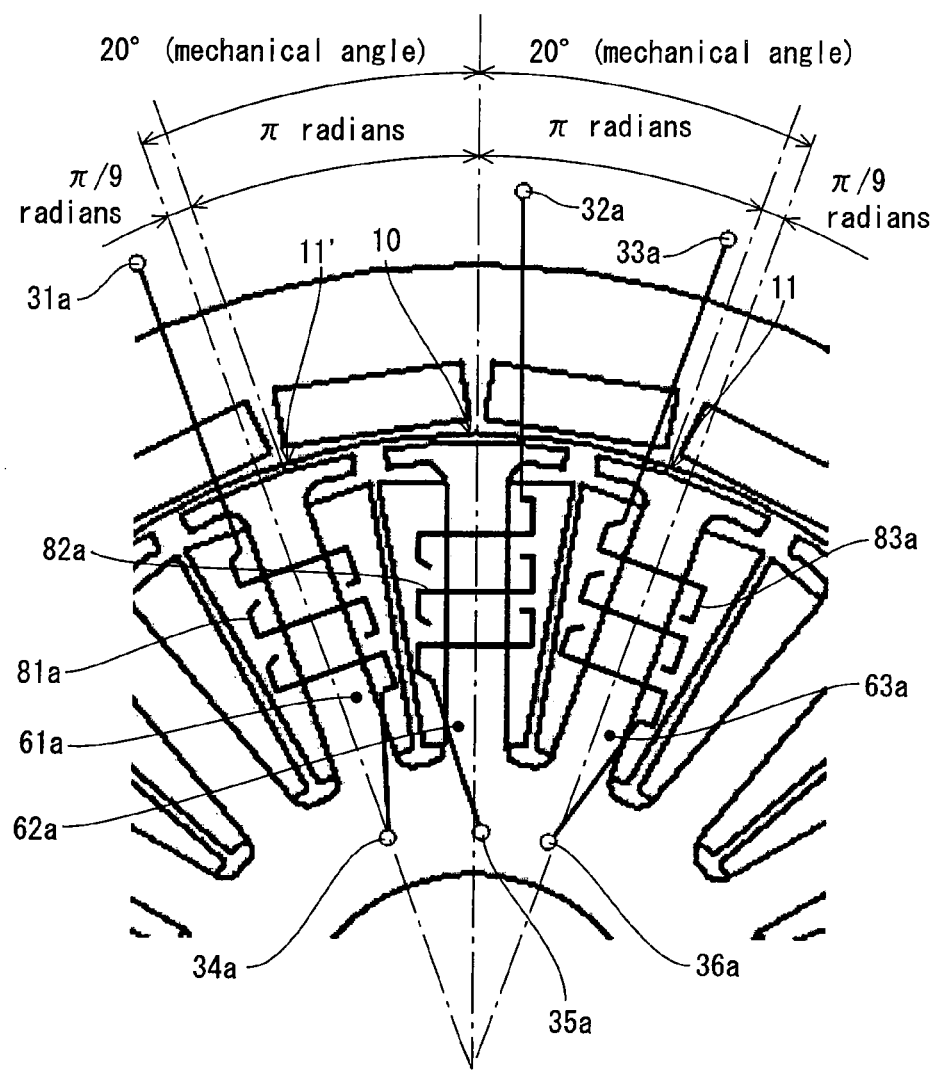
FIG. 3 is a detail view of the synchronous motor of FIG. 2.

FIG. 2 is a plan view showing a synchronous motor included in the synchronous motor drive system pertaining to the first embodiment of the present invention. FIG. 3 is a detail view of the synchronous motor of FIG. 2.

A synchronous motor 41 includes a rotor 2 and a stator 43.

The rotor 2 includes a rotor core 4 and a plurality of permanent magnets 5. The permanent magnets 5 are arranged circumferentially (i.e. along a rotation direction of the rotor) in the rotor core 4 of the rotor 2 at equal angular intervals. The synchronous motor 41 of the present embodiment is an interior permanent magnet (IPM) motor in which the permanent magnets 5 are arranged inside the rotor core. The permanent magnets 5 form magnetic poles 6 composed of pairs of N-poles and S-poles. The N-poles and S poles are alternately arranged with respect to the stator 43. Each magnetic pole pair of an N-pole and an S-pole equals to 2Π electrical radians, and is arranged so that each magnetic pole equals to Π electrical radians. In the present embodiment, the rotor 2 has twenty magnetic poles, and the electrical angle is ten times the mechanical angle.

The stator 43 includes a plurality of stator teeth 47 arranged diametrically opposite to the rotor 2. The stator 43 also includes stator coils 9 each wound around a stator tooth 47 by concentrated winding. Every three consecutive stator teeth 47 belong to one of a plurality of stator teeth groups 48. In the present embodiment, there are six stator teeth groups arranged with an offsets of 60 mechanical degrees.

The number of the magnetic poles circumferentially arranged in the rotor 2 is twenty in total, and the number of the stator teeth totals to 18. Accordingly, the magnetic poles and the stator teeth are off set at a ratio of 10 to 9 per semicircle.

It is assumed that an anti-clockwise rotation direction is + in FIG. 2. A stator teeth group 48b is arranged with an offset of −60 mechanical degrees, that is, +2Π/3 electrical radians with respect to a stator teeth group 48a. A stator teeth group 48c is arranged with an offset of +60 mechanical degrees, that is, +4Π/3 radians (i.e. −2Π/3 radians) in electrical angle with respect to the stator teeth group 48a. Accordingly, the stator teeth group 48a, the stator teeth group 48b, and the stator teeth group 48c are arranged at intervals of 2Π/3 electrical radians from each other.

In the synchronous motor of the present embodiment, the arrangement of the stator teeth group 48a, the stator teeth group 48b, and the stator teeth group 48c is repeated twice circumferentially (so there are also a stator teeth group 48a', a stator teeth group 48b', and a stator teeth group 48c').

A description is now given in details of the structure of the stator teeth group 48a, in conjunction with FIG. 3. The description below discusses mechanical angles between stator coils. Note that the mechanical angles are angles between centers of the stator teeth wound with the respective stator coils (the centers of the stator teeth are represented in chain lines). The stator teeth group 48a is composed of three consecutive stator teeth 61a, 62a, and 63a. The stator teeth 61a, 62a, and 63a are respectively wound with the stator coils 81a, 82a, and 83a by concentrated winding such that the winding direction of each of the stator coils 81a, 82a, and 83a is alternately opposite to each other. The stator tooth 61a wound with the stator coil 81a is positioned at +20 mechanical degrees with respect to the stator tooth 62a wound with the stator coil 82a. In other words, the stator coil 81a is arranged with an additional offset of +Π/9 radians besides an offset of Π radians (i.e. 18 mechanical degrees) that is an electrical angle indicating the interval between magnetic poles. Similarly, the stator coil 83a is positioned at −20 mechanical degrees with respect to the stator coil 82a. In other words, the stator coil 83a is arranged with an additional offset of −Π/9 radians besides an offset of Π radians that is an electrical angle indicating the interval between magnetic poles. Note that the stator teeth in the embodiment are arranged circumferentially at equal intervals of 360/18=20 degrees. On the other hand, twenty magnetic poles of the rotor are distributed circumferentially at equal intervals of 360/20=18 degrees.

This also applies to the other two stator teeth groups 48b and 48c. In other words, like the above-mentioned stator teeth group 48a, three coils of each stator teeth group are arranged with additional offsets of +Π/9 radians and −Π/9 radians besides an offset of Π radians that is an electrical angle indicating the interval between magnetic poles.

Figure 4:
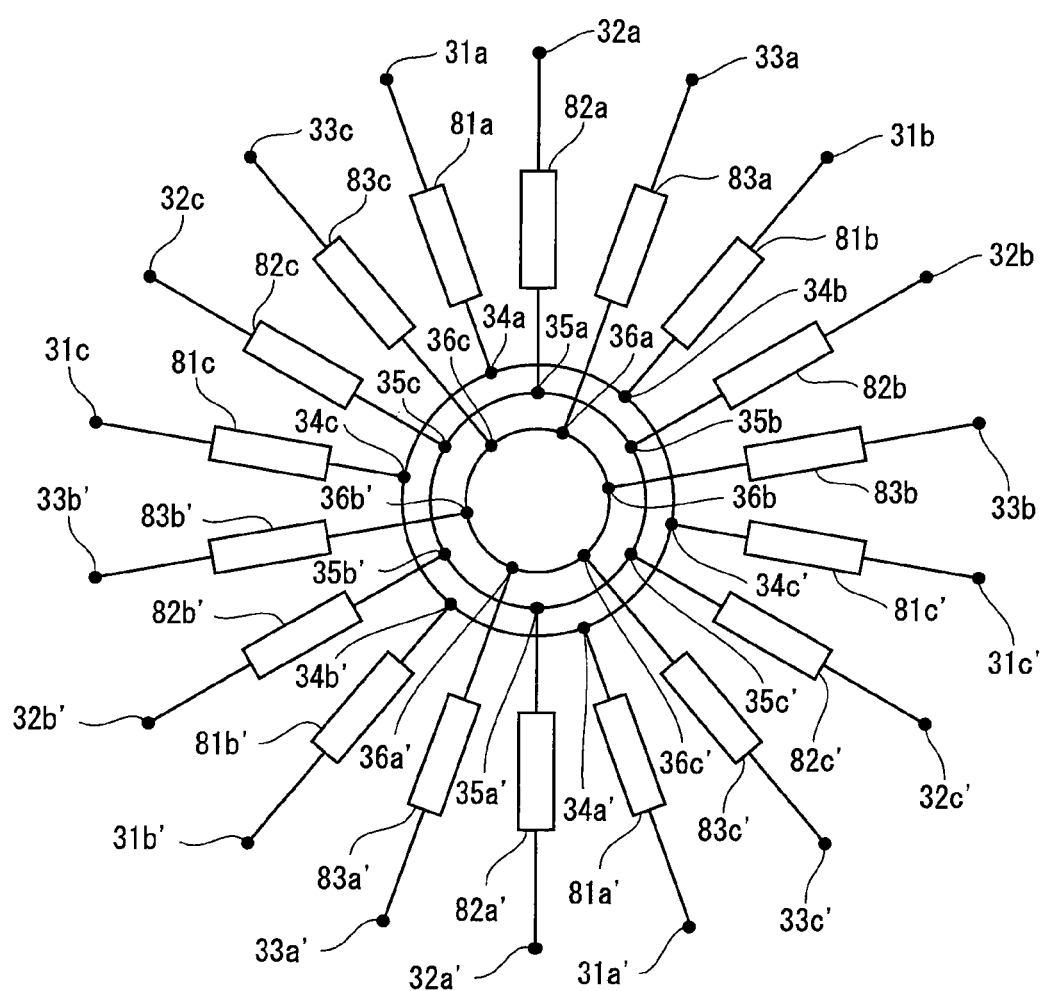
FIG. 4 is a view illustrating stator coil connections of the synchronous motor of FIG. 2.

FIG. 4 is a view illustrating stator coil connections of the synchronous motor of FIG. 2.

The alphabets a, b, and c following the reference signs of stator coil terminals shown in the figure correspond to coils belonging to the stator teeth groups 48a, 48b, and 48c, respectively.

The stator coils 81a, 82a, and 83a belonging to the stator teeth group 48a respectively have coil terminals 31a, 32a, and 33a. The coil terminals 31a, 32a, and 33a separately extend outside to be connected to u-phase connection terminals of the inverters 101, 102, and 103, respectively. Similarly, coil terminals 31b, 32b, and 33b in the stator teeth group 48b separately extend outside to be connected to v-phase connection terminals of the inverters 101, 102, and 103, respectively. Coil terminals 31c, 32c, and 33c in the stator teeth group 48c separately extend outside to be connected to w-phase connection terminals of the inverters 101, 102, and 103, respectively.

Additionally, stator coil terminals in different stator teeth groups 48a, 48b, and 48c are connected to common neutral points in a manner such that the connected terminals have a phase difference of 2Π/3 radians with each other. More specifically, coil terminals 34a, 34b, and 34c are connected to the first neutral point. Coil terminals 35a, 35b, and 35c are connected to the second neutral point. Coil terminals 36a, 36b, and 36c are connected to the third neutral point. Although in this example the first, second, and third neutral points are electrically separated, two or all of them may be electrically connected.

Further, in the present embodiment there are two stator teeth groups 48a, two stator teeth groups 48b, and two stator teeth groups 48c. Teeth groups with the same one of the alphabets a, b, and c each have the same positional relations with respect to the magnetic poles of the rotor in terms of electrical angle. Accordingly, it is possible to cause three consecutive groups among six stator teeth groups to have a neutral point connection. It is also possible to cause three alternately arranged stator teeth groups to have a neutral point connection. It is even possible to cause all six stator teeth groups to have a neutral point connection.

This concludes the description of the synchronous motor included in the synchronous motor drive system pertaining to the first embodiment of the present invention. As mentioned above, 18 stator teeth are arranged at different intervals from the magnetic poles of the rotor. Every three circumferentially consecutive stator teeth belong to one of the plurality of stator teeth groups. Three stator teeth in each stator teeth group are separately connected to independent external terminals.

The term "separate" in the description refers to a relation between stator coils belonging to a single stator teeth group, and does not refer to a relation between stator coils belonging to different stator teeth groups. Accordingly, stator coils belonging to different stator teeth groups may be commonly connected if condition permits. For example, the stator coil 81a in the stator teeth group 48a and the stator coil 81a' in the stator teeth group 48a' may be connected to a common external terminal, because the stator coils are supplied with currents in the same phase. Naturally, the stator coils may be separately connected to external terminals.

The synchronous motor drive system according to the first embodiment of the present invention includes a drive device for supplying currents of different phases to coil terminals of the synchronous motor. Now a description is made of an exemplary current application method for driving the synchronous motor 41 having the structure shown in FIG. 2 and FIG. 3 rotationally.

Figure 5C:
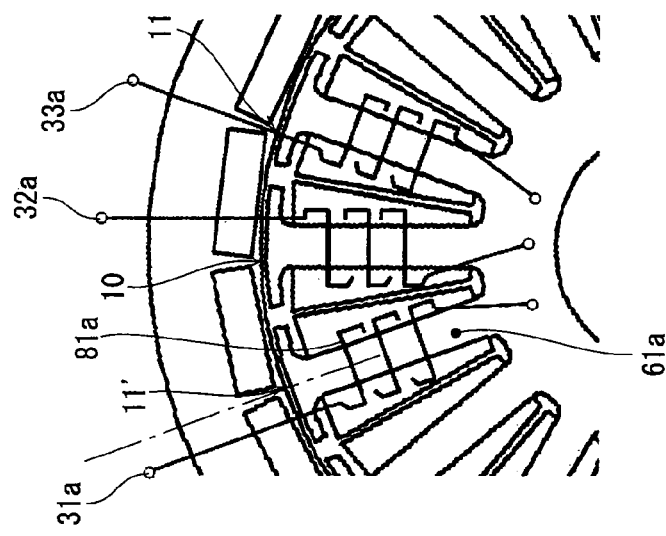
FIGS. 5A, 5B, and 5C show positional relations between a stator and a rotor pertaining to the first embodiment of the present invention.
Figure 5B:
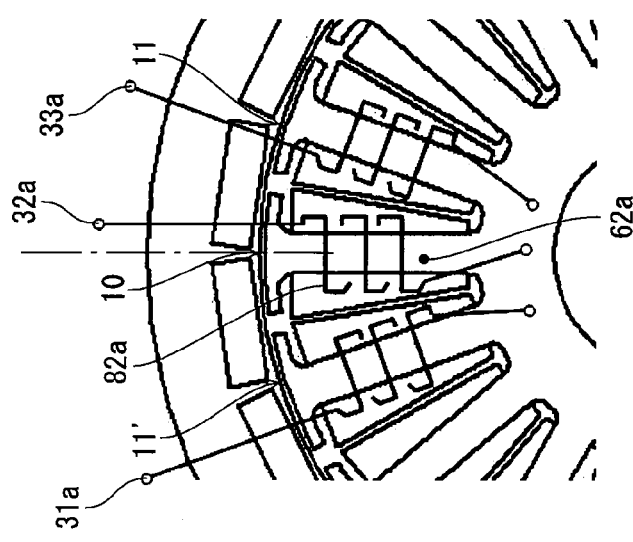
Figure 5A:
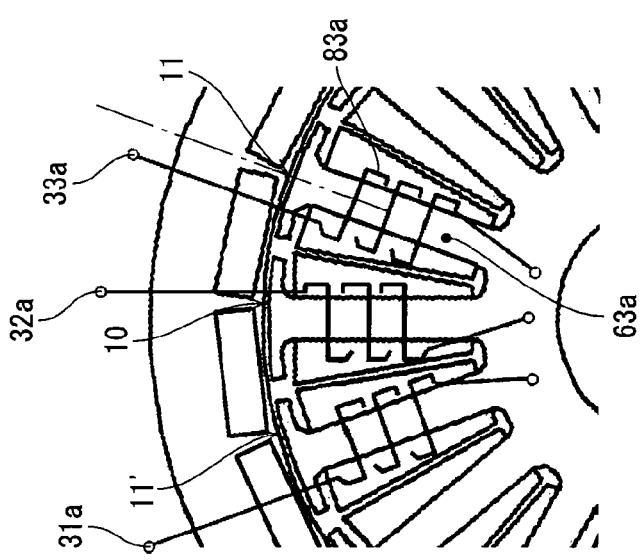

FIG. 5 shows positional relations between the stator and the rotor pertaining to the first embodiment of the present invention. FIG. 5A, FIG. 5B, and FIG. 5C show the positional relations between the stator and the rotor in each of which the rotor 2 has been rotated by 2 mechanical degrees (i.e. Π/9 electrical radians) anti-clockwise.

In FIG. 2 and FIG. 3, points 10 and 11 between magnetic poles of the rotor are shown. The points 10 and 11 between magnetic poles indicate positions of magnetic neutral points between the N-poles and the S-poles formed by the permanent magnets 5 arranged in the rotor 2. In this embodiment, the points 10 and 11 between magnetic poles coincide mechanical positions midway between two magnets. When seen from the counterclockwise direction, an N-pole changes over to an S-pole at a point 10 between magnetic poles and an S-pole changes over to an N-pole at a point 11 between magnetic poles. Note that a point 11' between magnetic poles is the same as the point 11 between magnetic poles in terms of electrical angle, but is different from the point 11 between magnetic poles in terms of mechanical angle.

In the positional relation shown in FIG. 5A, the center of the stator tooth 63a and the point 11 between magnetic poles of the rotor are aligned and facing each other, as indicated by the chain line. In this positional relation, it is possible to maximize magnet torque caused by the permanent magnets by supplying currents while adjusting the current phases so as to maximize the current flowing to the stator coil 83a connected to the inverter 103. As described with reference to FIG. 3, two consecutive magnetic poles form an angle of 18 degrees, whereas two consecutive stator teeth form an angle of 20 degrees. Due to the angle difference, in the state where the center of the stator tooth 63a and the point 11 between magnetic poles of the rotor are aligned and facing each other, the center of the stator tooth 62a and the point 10 between magnetic poles of the rotor are out of alignment. At the same time, the center of the stator tooth 61a and the point 11' between magnetic poles of the rotor are also out of alignment.

FIG. 5B shows the state in which the rotor 2 has been rotated by 2 mechanical degrees (i.e. Π/9 electrical radians) anti-clockwise from the state shown in FIG. 5A. As indicated by the chain line, the center of the stator tooth 62a and the point 10 between magnetic poles of the rotor are aligned and facing each other. In this positional relation, it is possible to maximize magnet torque caused by the permanent magnets by supplying currents while adjusting the current phases so as to maximize the current flowing to the stator coil 82a connected to the inverter 102. In this state, the center of the stator tooth 63a and the point 11 between magnetic poles of the rotor are out of alignment. At the same time, the center of the stator tooth 61a and the point 11' between magnetic poles of the rotor are also out of alignment.

FIG. 5C shows the state in which the rotor 2 has been rotated by 2 mechanical degrees (i.e. Π/9 electrical radians) anti-clockwise from the state FIG. 5B. As indicated by a chain line, the center of the stator tooth 61a and the point 11' between magnetic poles of the rotor are aligned and facing each other. In this positional relation, it is possible to maximize magnet torque caused by the permanent magnets by supplying currents while adjusting the current phases so as to maximize the current flowing to the stator coil 81a connected to the inverter 101. In this state, the center of the stator tooth 63a and the point 11 between magnetic poles of the rotor are out of alignment. At the same time, the center of the stator tooth 62a and the point 10 between magnetic poles of the rotor are also out of alignment.

Thus, at time points in which the positional relations of FIG. 5A, FIG. 5B, and FIG. 5C are established, namely in which the centers of the stator teeth 61a, 62a, and 63a are facing magnetic poles of the rotor, currents are supplied while adjusting the current phases so as to maximize the current supplied to one of the stator coils 81a, 82a, and 83a in each time point. By doing so, magnet torque is maximized in each stator tooth, whereby the overall torque is increased.

As has been described so far, an interval between two consecutive poles of the rotor is 18 mechanical degrees (i.e. Π electrical radians). On the other hand, an interval between three stator teeth belonging to a stator teeth group is not 18 degrees but 20 mechanical degrees. Such a mechanical phase difference allows reducing the cogging torque that is a torque ripple generated when the synchronous motor 41 is not supplied with currents.

In the synchronous motor 41 has the following configuration, each stator tooth in a stator teeth group is arranged to have a phase difference of Π/9 radians with respect to Π electrical radians. By supplying currents to the stator coils wound around the stator teeth such that the current flowing to each stator coil has a phase difference of Π/9 radians, each stator tooth yields the same amount of torque. As a result, the torque ripple having a fundamental period of Π/3 radians is cancelled, and the torque yielded by each stator tooth is maximized, whereby the overall torque is increased.

Note that in the description with reference to FIG. 5, only the magnet torque generated by the permanent magnets is taken into consideration. Thus, the phases of currents are adjusted so as to maximize the current flowing to a stator coil when the center of the stator tooth and the point between magnetic poles of the rotor are aligned and facing each other. However, the synchronous motor of the present embodiment is what is called an interior permanent magnet synchronous motor that has permanent magnets arranged inside the rotor core. Accordingly, the synchronous motor of the embodiment is able to utilize reluctance torque resulting from a difference in magnetoresistance, along with the magnet torque generated by the magnets. In order to maximize the torque by utilizing both the magnet torque and the reluctance torque, it is in some cases effective to advance the phases of the currents so as not to maximize the current flowing to a stator coil when the center of the stator tooth and the point between magnetic poles of the rotor are aligned and facing each other.

This concludes the detailed description of the synchronous motor 41.

Now a description is made of the detail of inverter control performed by the current application control unit 52.

Figure 6:
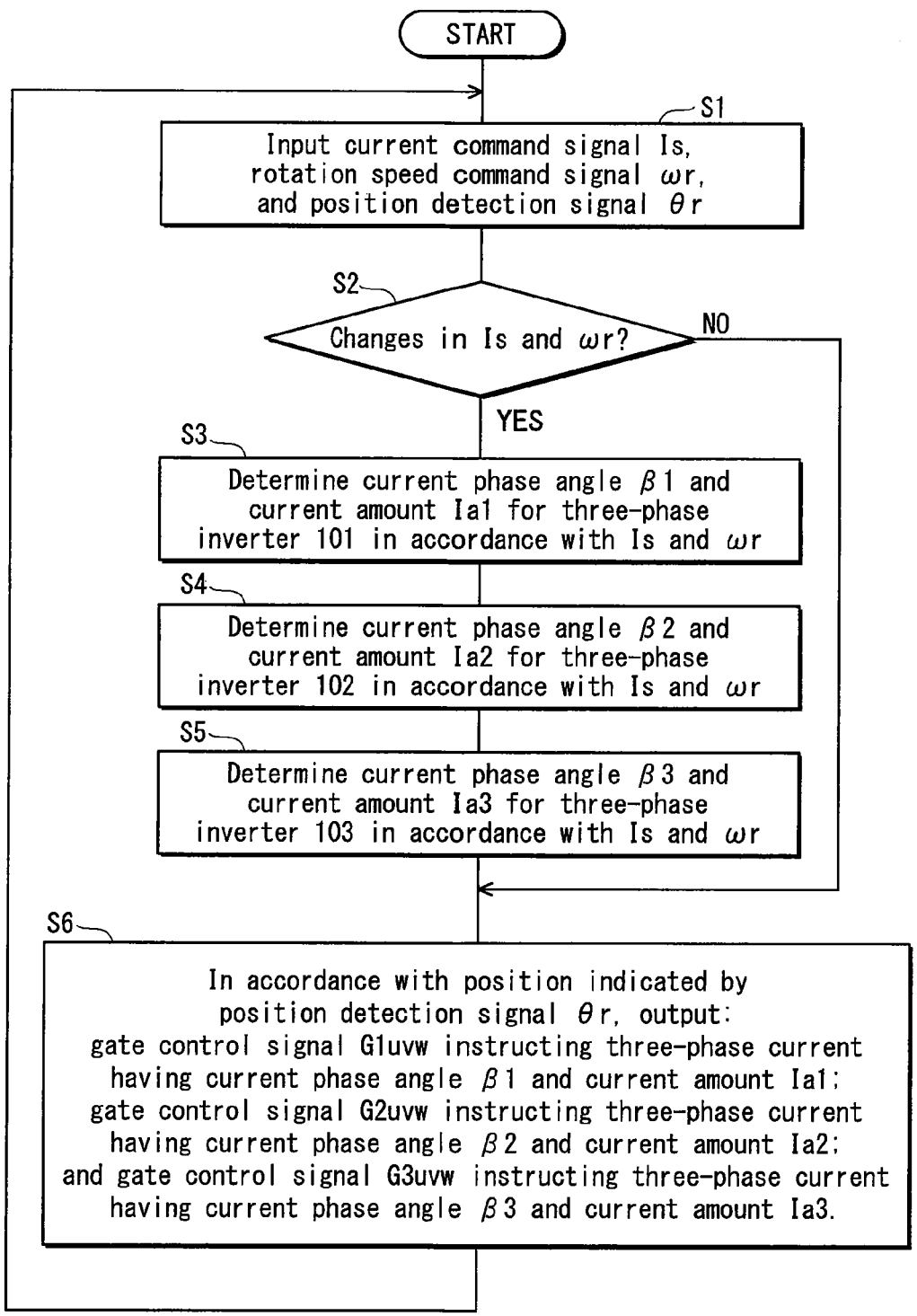
FIG. 6 is a flowchart showing procedures of inverter control processing in a current application control unit 52.

FIG. 6 is a flowchart showing the procedures of inverter control processing in the current application control unit 52.

The current application control unit 52 repeats a loop of Step S1 through Step S6. By doing so, the current application control unit 52 outputs the appropriate gate control signals G1$uvw$, G2$uvw$, and G3$uvw$ as needed, while monitoring the position of the rotor and current value of each power wiring which are obtained from the position detection signal θr and each current detector. In the inverter control processing, the present embodiment is characterized as follows. If a change occurs in one of the current command signal Is and the rotation speed command signal ωr (YES in Step S2), the processing moves on to the following Steps S3, S4, and S5. In Steps S3, S4, and S5, the current application control unit 52 refers to the map data tables held in the internal ROM. This is to separately determine a current phase angle β1 and a current amount Ia1 for the inverter 101, a current phase angle β2 and a current amount Ia2 for the inverter 102, and a current phase angle β3 and a current amount Ia3 for the inverter 103, in response to the current command signal Is and the rotation speed command signal ωr. The map data tables used in Steps S3, S4, and S5 are different from each other.

Specifically, in the map data tables for the inverters 101, 102, and 103 in the present embodiment, in the case in which the rotation speed command signal ωr instructs driving at a low rotation speed, compatible values of current phase angles β and current amounts Ia are mapped in correspondence with the current command signal Is and the rotation speed command signal ωr. However, as the rotation speed command signal ωr instructs driving at a higher rotation speed, the mapped values of current phase angles β and current amounts Ia are varied in the respective map data tables for the inverters 101, 102, and 103. Each inverter is thus caused to output currents with different current phase angles β and different current amounts Ia in the case of driving at a high rotation speed, because of an intention to perform flux weakening control appropriately.

Figure 7:
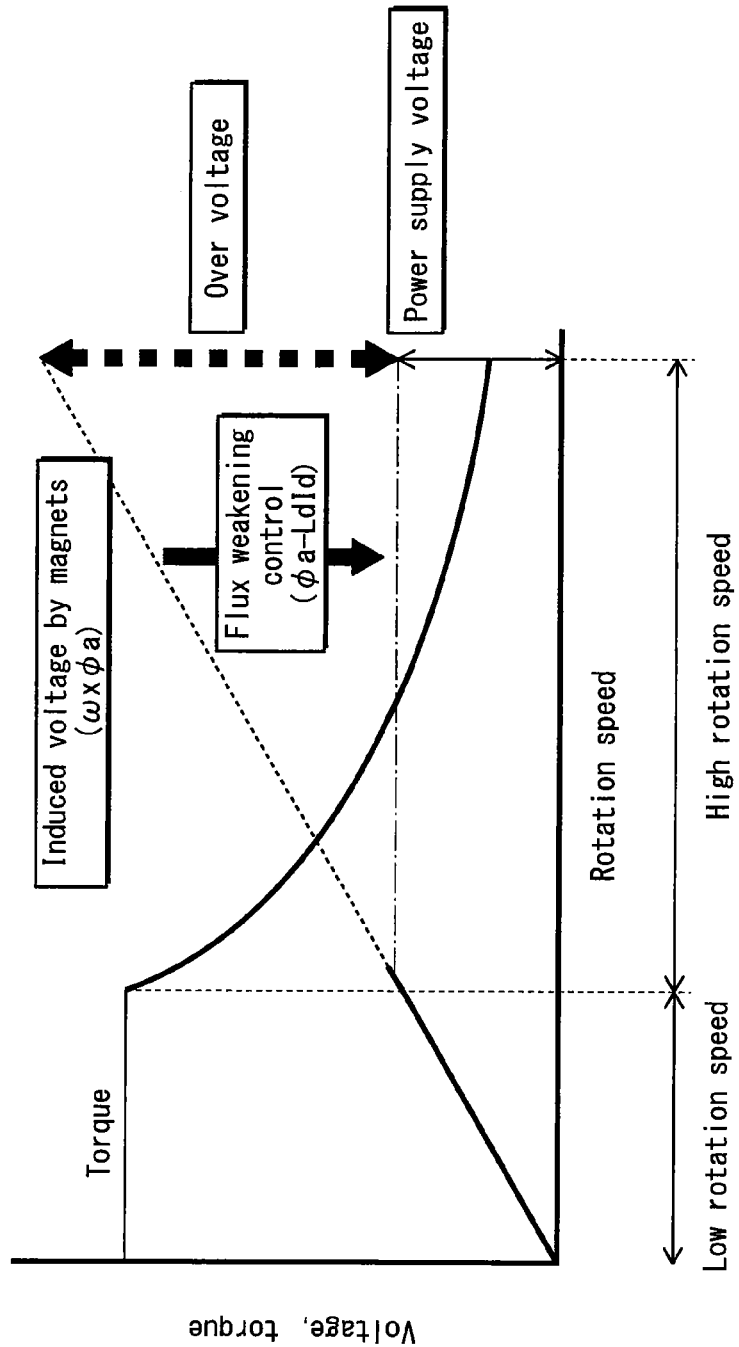
FIG. 7 shows a relation between rotation speed of a synchronous motor and induced field voltage generated by permanent magnets.

Note that in the present invention the high rotation speed refers to a speed in the range where induced field voltage (ω×φa) produced in the coils by magnetic fields of the permanent magnets in the rotor is greater than or equal to the power supply voltage of the DC power supply 1, as shown in FIG. 7. In contrast, the low rotation speed refers to a speed in the range where induced field voltage (ω×φa) produced in the coils by magnetic fields of the permanent magnets in the rotor is less than the power supply voltage of the DC power supply 1. In FIG. 7, ω is an electrical angular velocity, φa is interlinkage flux, and the induced field voltage (ω×φa) proportionally increases as the rotation speed increases. The current application control unit 52 performs flux weakening control in the range of high rotation speed shown in the figure.

A specific description is given below of how the inverters 101, 102, and 103 operate under control of the current application control unit 52. Firstly, a description is made of the operations of the inverters 101, 102, and 103 in the case that the synchronous motor 41 is driven at a low rotation speed.

Figure 8:
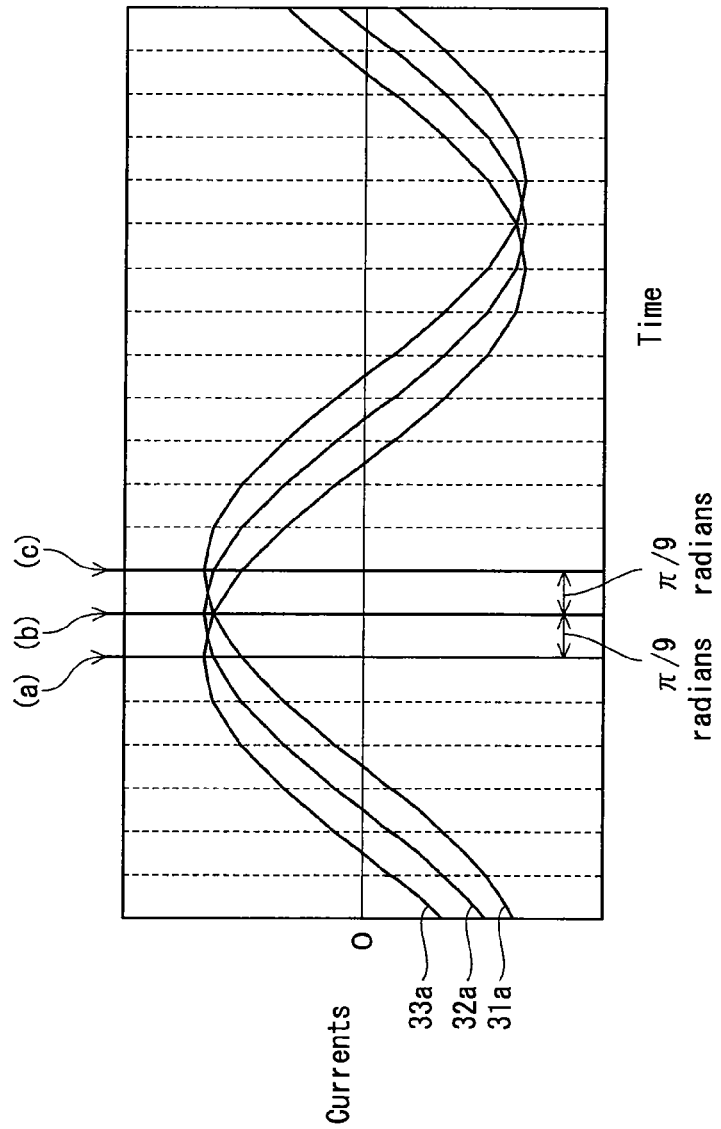
FIG. 8 shows temporal transitions of currents applied to stator coils by inverters in the case of driving at a low rotation speed.

FIG. 8 shows temporal transitions of currents applied to the stator coils by the inverters in the case of driving at a low rotation speed. Time points shown as (a), (b), and (c) in FIG. 8 correspond to the positional relations shown in FIG. 5A, FIG. 5B, and FIG. 5C, respectively.

In FIG. 8, the vertical axis represents the current supplied to the coil terminals 31*a*, 32*a*, and 33*a* (of the stator coils 81*a*, 82*a*, and 83*a*), while the horizontal axis represents time. As shown in FIG. 8, with respect to the current supplied to the coil terminal 32*a* by the inverter 102, the current supplied to the coil terminal 33*a* by the inverter 103 is advanced by Π/9 radians. On the other hand, with respect to the current supplied to the coil terminal 32*a* by the inverter 102, the current supplied to the coil terminal 31*a* by the inverter 101 is delayed by Π/9 radians.

Between the arrangement relations among the stator coils and the currents supplied to the stator coils, there is the following relation.

With respect to the stator coil 82*a*, the stator tooth 83*a* is arranged with an additional offset of −Π/9 radians besides an offset of Π electrical radians. Regarding such an arrangement relation, with respect to the current supplied to the stator coil 82*a*, the current supplied to the stator coil 83*a* is advanced by Π/9 radians. On the other hand, with respect to the stator coil 82*a*, the coil 81*a* is arranged with an additional offset of +Π/9 radians besides an offset of Π electrical radians. Regarding such an arrangement relation, with respect to the current supplied to the stator coil 82*a*, the current supplied to the stator coil 81*a* is delayed by Π/9 radians.

Thus, all the current phase angles β1, β2, and β3 of the currents output by the inverters 101, 102, and 103 become zero. Currents are supplied by adjusting the current phases as follows: in the positional relation of FIG. 5A, the current phases are adjusted so as to maximize the current flowing to the stator coil 83*a*; in the positional relation of FIG. 5B, the current phases are adjusted so as to maximize the current flowing to the stator coil 82*a*; and in the positional relation of FIG. 5C, the current phases are adjusted so as to maximize the current flowing to the stator coil 81*a*. This maximizes the magnet torque generated by each stator tooth, thereby increasing the overall torque.

Figure 9:
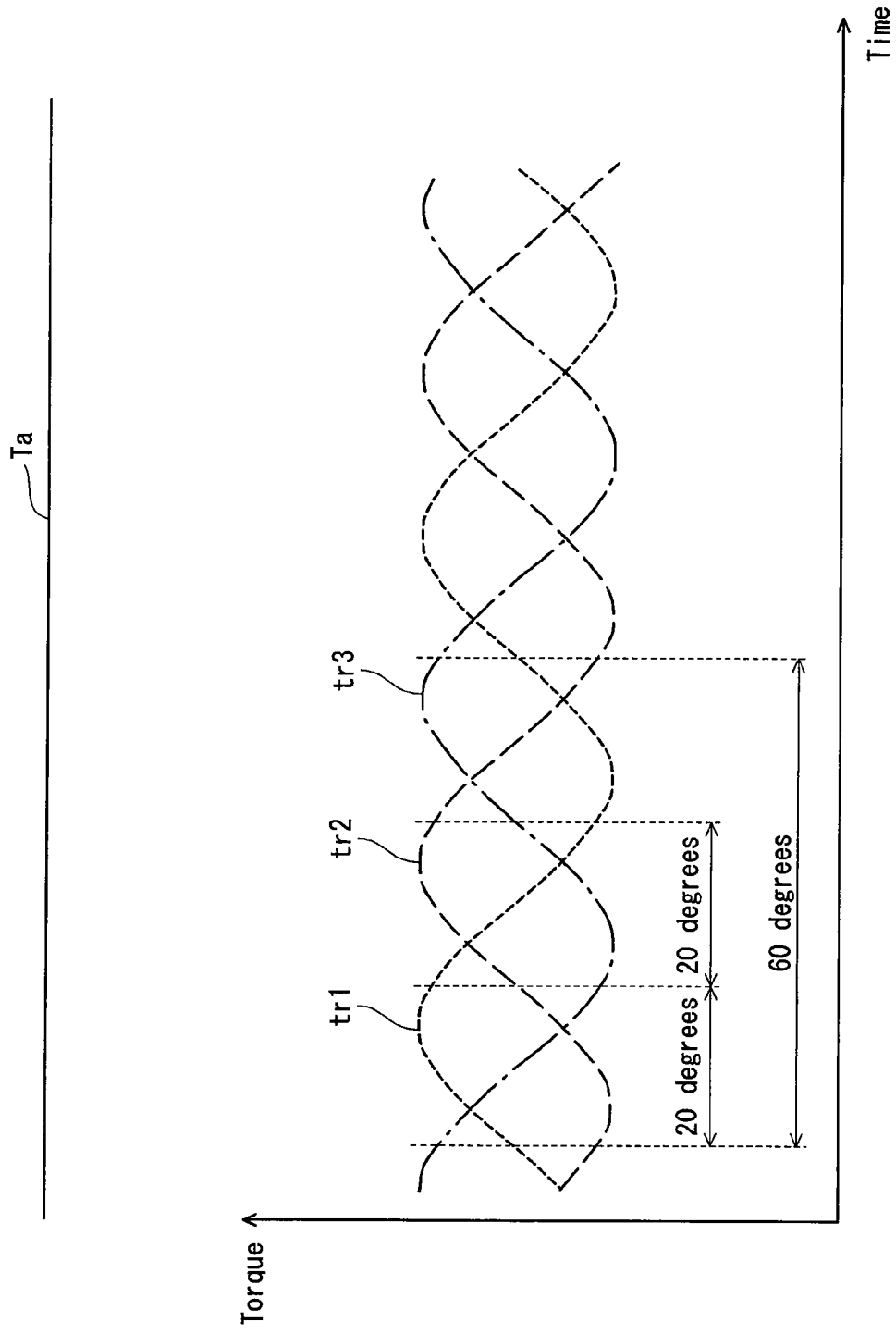
FIG. 9 shows torque waveforms generated when each current shown in FIG. 8 is applied by inverters 101, 102, and 103.

Meanwhile, conventional synchronous motors generate magnet torque in order to drive rotationally by a three-phase alternating current supplied from an inverter. In a conventional three-phase coil group supplied with a three-phase alternating current from a single inverter, torque ripple is generated that has a period of an 60 electrical degrees. To address this, in the present embodiment, a phase difference of Π/9 radians (i.e. 20 degrees) is provided between the current supplied from the inverter 101 and the current supplied from the inverter 102, and between the current supplied from the inverter 102 and the current supplied from the inverter 103, as shown in FIG. 8. In this case, the coil groups 200*a*, 200*b*, and 200*c* supplied with the three-alternating currents from the inverters 101, 102, and 103 generate magnet torque having torque waveforms tr1, tr2, and tr3, respectively, as shown in FIG. 9. The torque waveforms tr1, tr2, and tr3 each have torque ripples whose main torque components have a period of 60 degrees. However, since the phases of the waveforms tr1, tr2, and tr3 are offset from each other by 20 degrees, the torque ripples are cancelled by each other. As a result, the torque ripples are considerably reduced in synthesized torque Ta generated in the whole synchronous motor 41 and obtained by synthesizing the waveforms tr1, tr2, and tr3.

Thus, by causing the inverters 101, 102, and 103 to operate to supply the currents as shown in FIG. 8, the ripple components having a period of 60 electrical degrees are cancelled, thereby suppressing the torque ripple considerably. This also allows reducing vibration and noise in the synchronous motor. Further, the reduction of vibration and noise in the synchronous motor brings about the following effect. The need for measures against vibration and noise is omitted in assemble of the synchronous motor system according to the present embodiment.

This concludes the operations of the inverters 101, 102, and 103 in the case of driving the synchronous motor 41 at a low rotation speed.

Secondly, a description is made of the operations of the inverters 101, 102, and 103 in the case of driving the synchronous motor 41 at a high rotation speed. Generally, in synchronous motors, induced field voltage produced in coils becomes an obstructive factor to driving at a high rotation speed. The relation between induced field voltage and rotation speed is described below in conjunction with FIG. 10.

Figure 10:
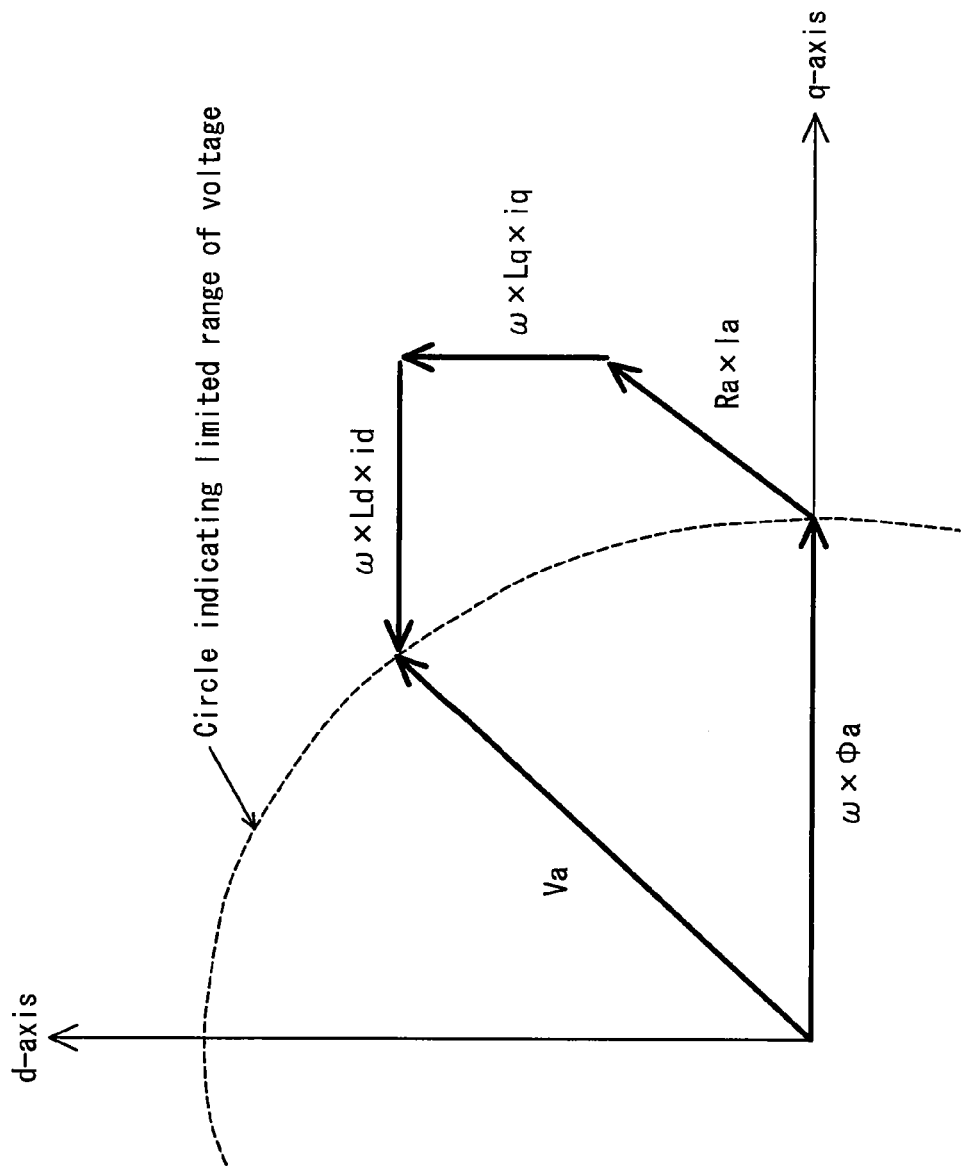
FIG. 10 is a fundamental vector diagram of a terminal voltage in the synchronous motor and a current applied to the motor.

FIG. 10 is a fundamental vector diagram of a terminal voltage and a current applied to a synchronous motor. A q-axis and a d-axis in the vector diagram form 90 electrical degrees. In the figure, a broken line is a circle indicating a limited range of voltage, ω is an electrical angular velocity, φa is interlinkage flux, Lq is a q-axis component of an inductance, Ld is a d-axis component of the inductance, Ra is coil resistance, Ia is a coil current, Iq is a q-axis component of the coil current, Id is a d-axis component of the coil current. Terminal voltage Va, which is a voltage required for driving a synchronous motor, is a sum total of induced field voltage produced by the permanent magnets (ω×φa), a voltage drop in coils (Ra×Ia), and induced field voltage produced by rotating magnetic fields (ω×Lq×Iq+ω×Ld×Id). A synchronous motor is able to drive only under the condition that the terminal voltage Va falls within the circle indicating the limited range of voltage as determined by a power supply voltage. In general, terminal voltage Va is represented by the following formula.

$$Va = \sqrt{(RaId - \omega LqIq)^2 + (RaIq + \omega LdId + \omega\phi a)^2}$$ [Formula 1]

The electrical angular velocity ω increases proportionally as the rotation speed of a rotor increases. Therefore, the increase of the rotation speed leads to a proportional increase of the induced field voltage produced by the permanent magnets (ω×φa), accordingly an increase of the terminal voltage Va.

In other words, the increase of the rotation speed causes the terminal voltage Va to fall outside the circle indicating the limited range of voltage.

In order to address this, by advancing the phase of the coil current with respect to the q-axis (i.e. by applying a current which does not contribute to torque and cancel the flux), the q-axis component and the d-axis component of the coil current may be brought under full control. By doing so, ω×Lq× Ld and ω×Ld×Id may also be brought under full control, whereby the terminal voltage Va is suppressed within the circle indicating the limited range of voltage. This is so called flux weakening control.

In the above description, if the synchronous motor is supplied with the current by a single inverter, the electrical angular velocity ω, the interlinkage flux φ, the q-axis component of the inductance, the d-axis component of the inductance, the coil resistance Ra, and the coil current Ia are based solely on the inverter. However, in the synchronous motor system pertaining to the present embodiment, the inverters 101, 102, and 103 each supply currents to different coil groups. Accordingly, for design and manufacturing reasons, the inverters 101, 102, and 103 each have different parameters except for the electrical angular velocity ω. In other words, even at the same rotation speed, optimal current phase angles β appropriate for flux weakening control are different in the inverters 101, 102, and 103. This is to say that, if all the inverters 101, 102, and 103 are supplied with currents having the same current phase angle, a rotation speed that is restricted by the power voltage varies in each inverter. In this case, it is impossible to take full advantage of the capability of the synchronous motor.

To address the above-mentioned problem, in the present embodiment, regarding rotation speeds at which flux weakening control is required, different values are mapped as the current phase angles β in a map data table for the inverter 101, a map data table for the inverter 102, and a map data table for the inverter 103. According to this, in the synchronous motor drive system of the present embodiment the terminal voltage is appropriately controlled for each inverter even in the case of driving at a high rotation speed. As a result, it becomes possible to take full advantage of motor characteristics.

Figure 11:
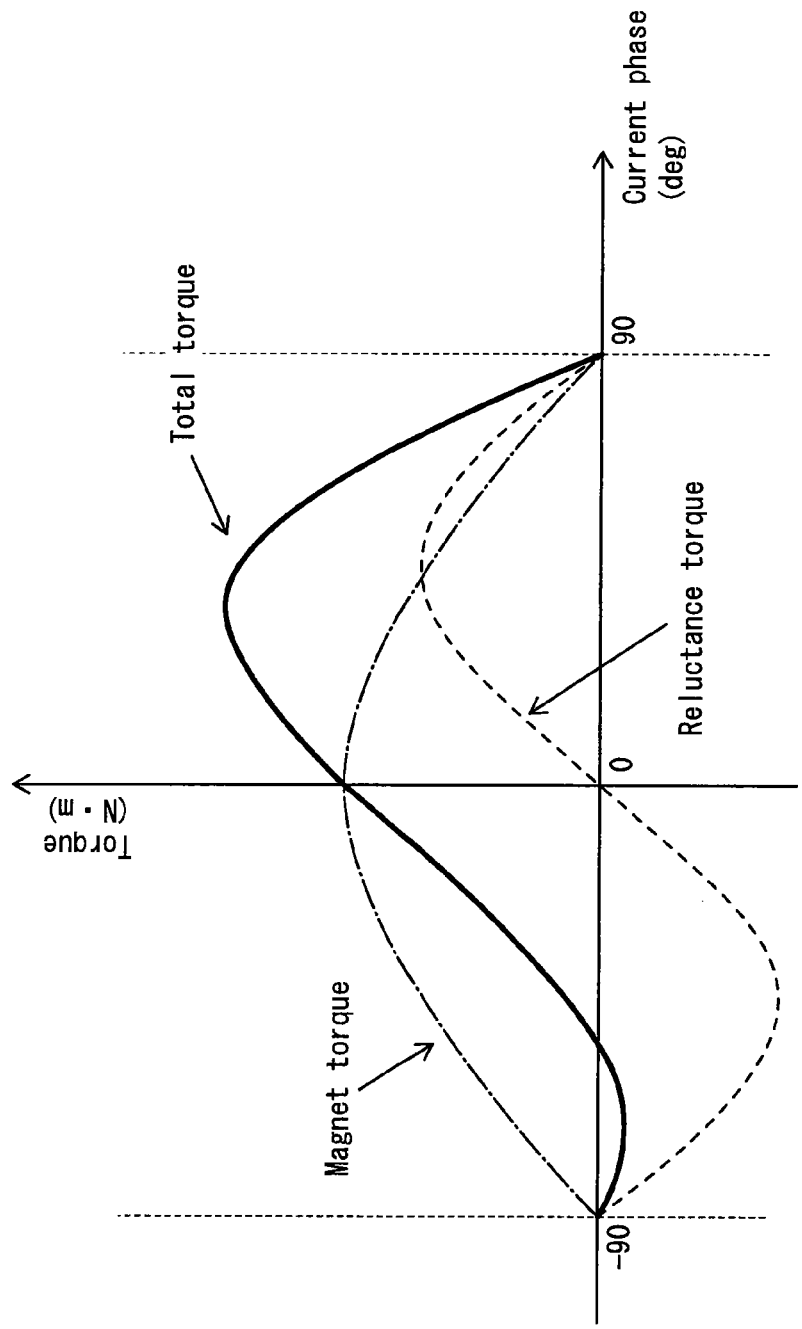
FIG. 11 shows a relation between current phase and torque in an interior permanent magnet synchronous motor in the case in which current is kept constant.
Figure 12:
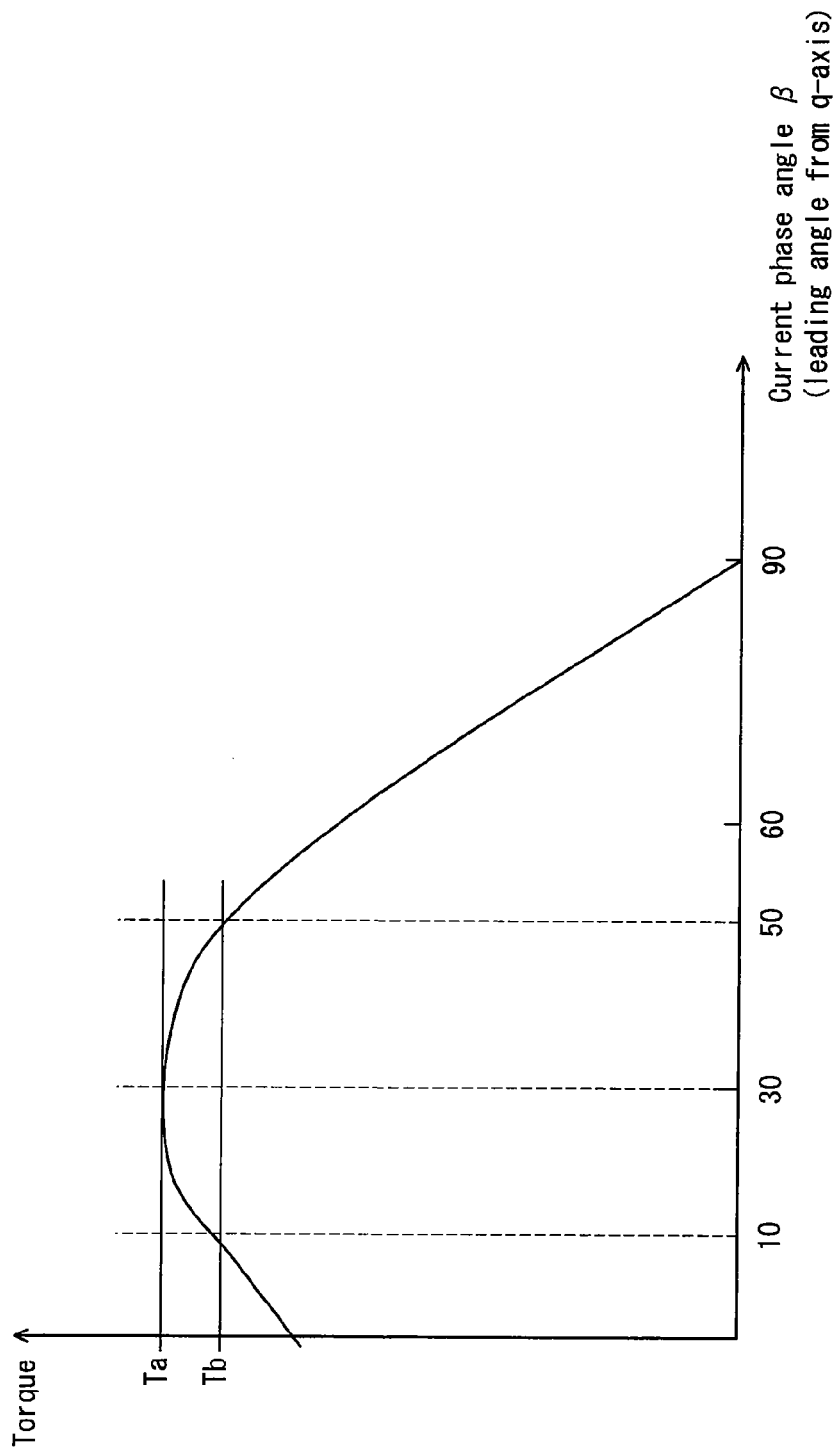
FIG. 12 shows a relation between current phase angle and torque in an interior permanent magnet synchronous motor.

Now a description is given of a relation between current phase angle β and torque with reference to FIG. 11 and FIG. 12.

FIG. 11 shows a relation between current phase and torque in an interior permanent magnet synchronous motor in the case in which current is kept constant. The horizontal axis represents current phase, while the vertical axis represents torque. In synchronous motors, it is possible to maximize magnet torque generated by the permanent magnets by supplying current while adjusting the current phase so as to maximize the current flowing to a stator coil in the positional relation in which the center of the stator tooth and a point between magnetic poles of a rotor are aligned and facing each other. Accordingly, as shown in FIG. 11, magnet torque is maximum when current phase angle is zero degree. However, in interior permanent magnet synchronous motors, reluctance torque caused by a difference in magnetoresistance may also be utilized along with magnet torque generated by magnets. Reluctance torque is maximum when current phase angle is around 45 degrees. Total torque generated in an interior permanent magnet synchronous motor is a torque amount obtained by summing up magnet torque and reluctance torque. Accordingly, total torque is maximum when the current phase angle β is within the range between zero and around 45 degrees.

FIG. 12 shows a relation between current phase angle and total torque. In the figure, the horizontal axis represents current phase angle, while the vertical axis represents total torque. In the example of FIG. 12, the maximum torque is generated when current phase angle is 30 degrees. In this way, in interior permanent magnet synchronous motors, reluctance torque is fully utilized and so generated torque greatly depends on current phase angle. The dependency on current phase angle also varies according to the current amount.

Accordingly, when a plurality of inverters each supply currents having different current phase angles β, it is preferable to vary the current amounts of the currents supplied to three coil groups connected to different inverters in accordance with the different current phase angles β, so as to equalize the torque amounts generated by the three coil groups. By doing so, torque ripples are effectively cancelled out in the three coil groups.

Figure 13:
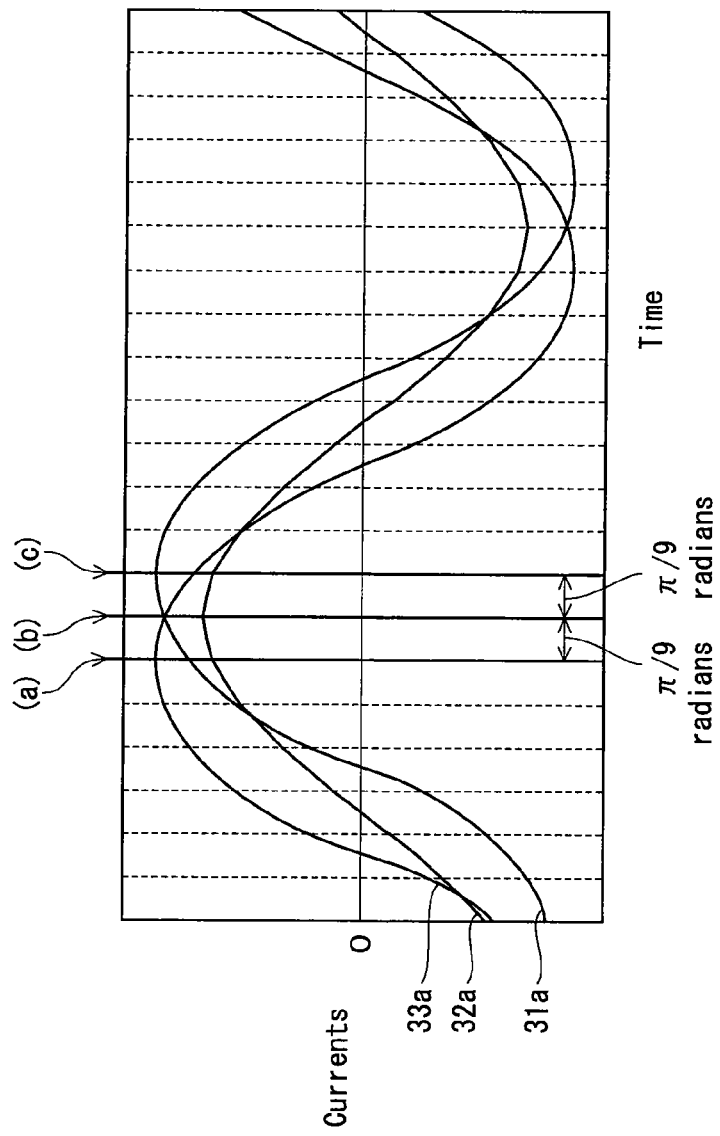
FIG. 13 shows temporal transitions of currents applied to stator coils by the inverters in the case of driving at a high rotation speed.

As an example, a description is given of the case in which all the coil groups 200a, 200b, and 200c of the synchronous motor 41 generate torque in agreement with the relation shown in FIG. 12. By the same amount of currents having current phase angles β of 10 degrees, 30 degrees, and 50 degrees, respectively, the coil groups 200a, 200b, and 200c generate different torque amounts of Tb, Ta, and Tb. As a result, torque ripples are not effectively cancelled by each other. In the example, by making the current amount supplied to each of the coil groups 200a and 200c larger than the current amount supplied to the coil group 200b as shown in FIG. 13, torque amounts generated in the coil groups 200a, 200b, and 200c are equalized.

Due to the above reasons, regarding the rotation speeds at which flux weakening control is required, different values are mapped as the current phase angles β and the current amounts Ia in a map data table for the inverter 101, a map data table for the inverter 102, and a map data table for the inverter 103 in the present embodiment. This is to vary the current phase angles β and the current amounts Ia of the currents supplied from respective inverters, in order to equalize the torque amounts generated by coil groups to which the currents are supplied from the respective inverters. By using such mapping data tables, the current application control unit 52 outputs the gate control signals G1uvw, G2uvw, and G3uvw as follows. To the inverter 102 supplying the current having a current phase angle of 30 degrees, the gate control signal G2uvw is output instructing the inverter 102 to set the current amount to supply to be Ia1. On the other hand, to the inverter 101 supplying the current having a current phase angle of 10 degrees and the inverter 103 supplying the current having a current phase angle of 50 degrees, the gate control signals G1uvw and G3uvw are output instructing the inverter 101 and the inverter 103 to set the current amounts to supply to be Ia2 that is greater than the current amount Ia1.

With the above structure, in the synchronous motor drive system pertaining to the present invention, the terminal voltage of each inverter is appropriately controlled even in the case of driving at a high rotation speed, making it possible to take advantage of characteristics of the motor. This concludes the description of the operations of the inverters 101, 102, and 103 in the case of driving the synchronous motor 41 at a high rotation speed.

As described above, the current application control unit 52 holds in the internal ROM the map data tables in which (i) the current phase angles β of the currents supplied by the inverters 101, 102, and 103 are determined separately so that appropriate flux weakening control is performed in accordance with characteristics of a coil group corresponding to each inverter and (ii) the current amounts supplied from the inverters 101, 102, and 103 to the coil groups 200a, 200b, and 200c are determined separately so that torque amounts generated in the coil groups 200a, 200b, and 200c are equalized. In accordance with the map data tables, the current application control unit 52 outputs the gate control signals. As a result, the overall torque generated in the synchronous motor 41 is increased while the torque ripple is suppressed.

Although in the first embodiment the current amounts supplied to the coil groups 200a, 200b, and 200c are determined separately so that the torque amounts generated in the coil groups 200a, 200b, and 200c are equalized, this is not limiting. It is suffice to determine the current amounts supplied to the coil groups 200a, 200b, and 200c separately so that torque amounts generated in at least two coil groups are equalized. In this case, at least two three-phase coil groups generate equivalent torque. Accordingly, by offsetting the phases of the torque from each other, the torque ripples of the torque are cancelled by each other, whereby the torque ripple generated in the synchronous motor as a whole is suppressed.

Meanwhile, the present embodiment has a structure in which switching devices constituting the inverters 101, 102, and 103 are packaged in a single module. This makes it possible to avoid high cost of the inverters and reduce complexity of wiring between the inverters and the motor considerably. Further, in the synchronous motor drive system pertaining to the present invention, the current phase angles may be varied from one inverter to another. Accordingly, although housed in the single module, each switching device produces heat at a different timing. As a result, the produced heat is effectively dissipated.

Modification 1 of the First Embodiment

Figure 14:
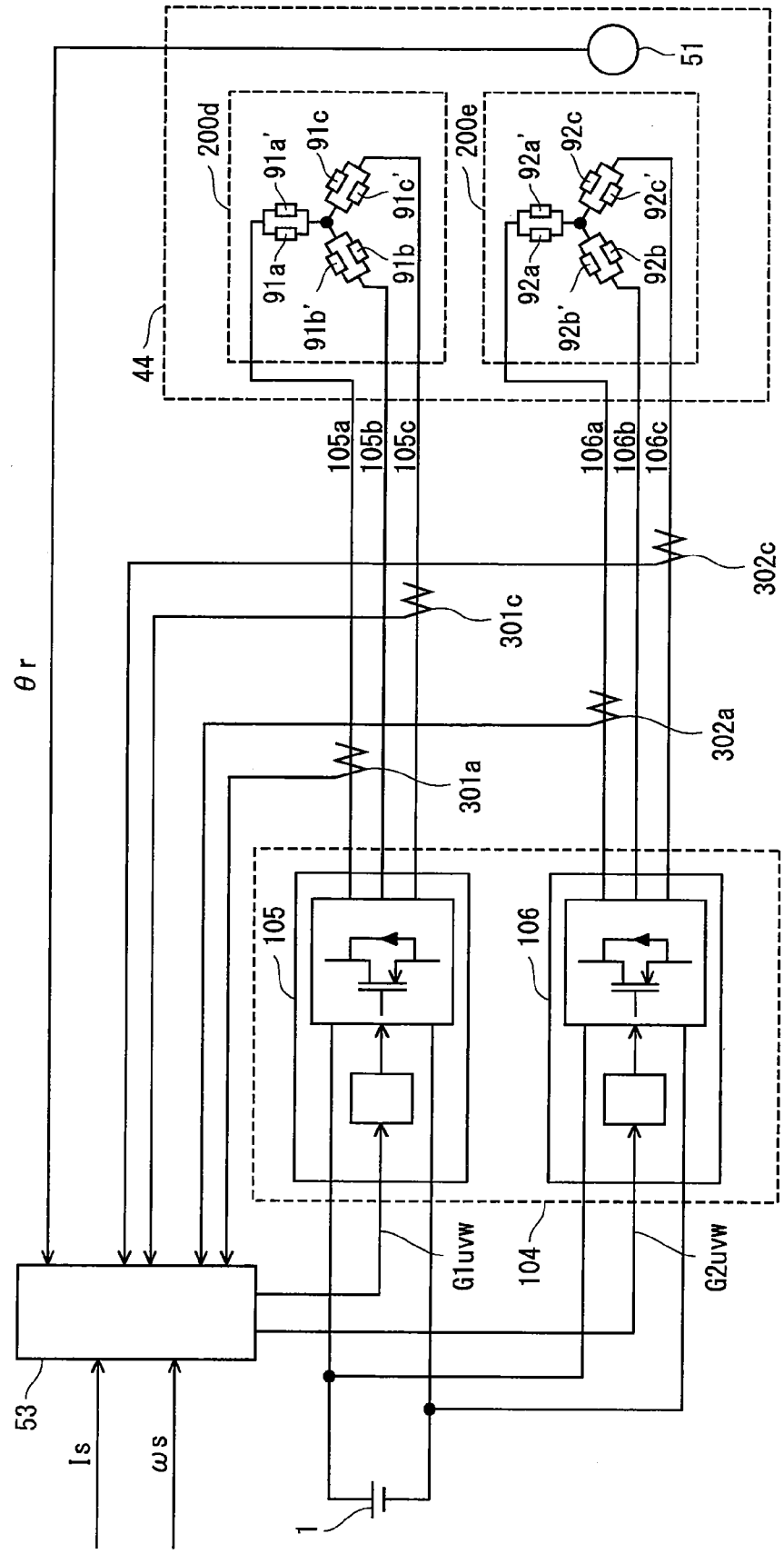
FIG. 14 shows an overall structure of a synchronous motor drive system pertaining to a first modification.

A description is made below of a modification in which the present invention is applied to a synchronous motor drive system including two inverters. FIG. 14 shows an overall structure of the synchronous motor drive system pertaining to the present modification.

In the present modification, the synchronous motor drive system includes a DC power supply 1, an inverter module 104, a synchronous motor 44, and a current application control unit 53.

The inverter module 104 internally has inverters 105 and 106. The inverters 105 and 106 perform DC/AC conversion operations in accordance with gate control signals G1$uvw$ and G2$uvw$ to supply three-phase alternating currents to the synchronous motor 44.

Figure 18:
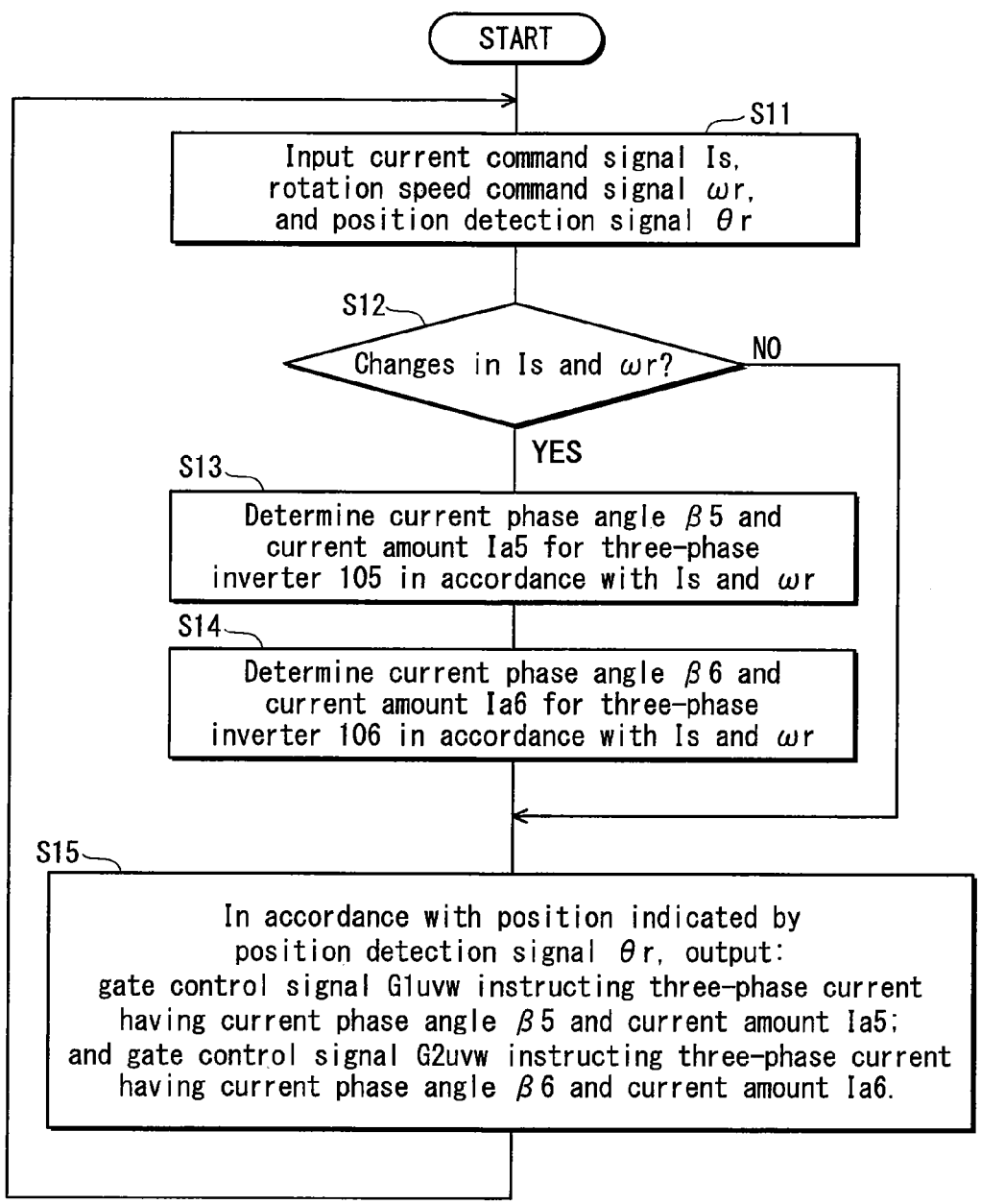
FIG. 18 is a flowchart showing procedures of inverter control processing in a current application control unit 53.

The current application control unit 53 is a microcomputer system that controls the operations of the inverters 105 and 106 by outputting the gate control signals G1$uvw$ and G2$uvw$. A ROM in the current application control unit 53 holds a plurality of map data tables in correspondence with the inverters 105 and 106. Each map data table indicates three-phase alternating currents that the current application unit 53 causes the corresponding inverter to output in response to various values of the current command signal Is and the rotation speed command signal ωr. Each three-phase alternating current is indicated in correspondence with a current phase angle β and a current amount Ia. As shown in FIG. 18, the current application control unit 53 determines, for each of the inverters 105 and 106, the current phase angle β and the current amount Ia in response to the current command signal Is and the rotation speed command signal ωr input thereto, by referring to the map data tables. The current application control unit 53 then outputs the gate control signals G1$uvw$ and G2$uvw$ so that each inverter outputs a three-phase alternating current having the determined current phase angle β and the determined current amount Ia, while monitoring the position of the rotor and the current value in each power wiring.

The synchronous motor 44 includes two coil groups 200d and 200e.

Figure 15:
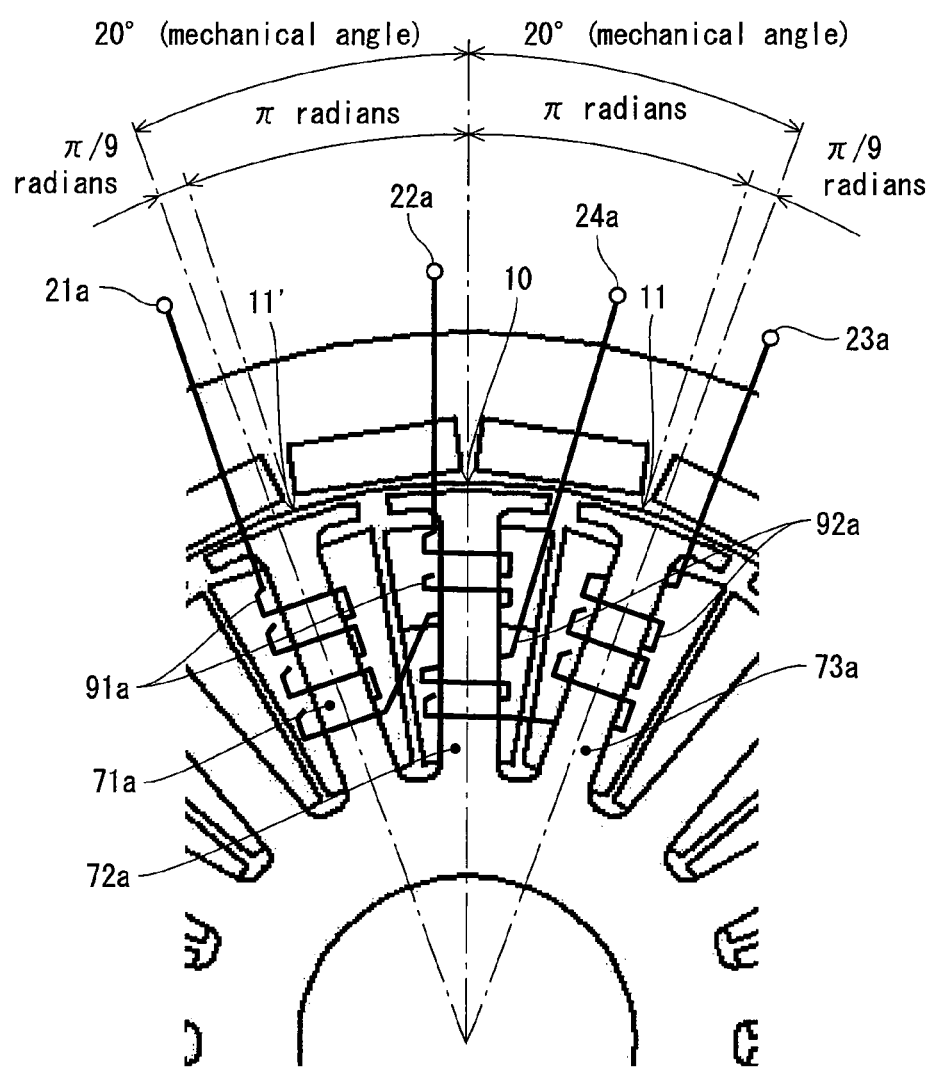
FIG. 15 is a detail view of a synchronous motor 44.

FIG. 15 is a detail view of a synchronous motor 44. A detailed description is given of the structure of the stator teeth group 48a in conjunction with FIG. 15. The description below discusses mechanical angles between stator coils. Note that the mechanical angles are angles between centers of the stator teeth wound with the respective stator coils (the centers of the stator teeth are represented in chain lines). The stator teeth group 48a is composed of three consecutive stator teeth 71a, 72a, and 73a.

The stator tooth 71a is positioned at +20 degree mechanical angle with respect to the stator tooth 72a. In other words, the stator tooth 71a is arranged with an additional offset of +Π/9 radians besides an offset of Π radians (i.e. 18 mechanical degrees) that is an electrical angle indicating the interval between magnetic poles. Similarly, the stator coil 73a is positioned at −20 degree mechanical angle with respect to the stator coil 72a. In other words, the stator coil 73a is arranged with an additional offset of −Π/9 radians besides an offset of Π radians that is an electrical angle indicating the interval between magnetic poles. Note that the stator teeth in the embodiment are arranged circumferentially at equal intervals of 360/18=20 degrees. On the other hand, twenty magnetic poles of the rotor are distributed circumferentially at equal intervals of 360/20=18 degrees.

The stator tooth 71a is wound with a part of stator coil 91a (having N1 number of turns). The stator tooth 73a is wound with a part of stator coil 92a (having N2 number of turns). The stator tooth 72a is wound with the remaining part of the stator coil 91a (having N21 number of turns) and the remaining part of the stator coil 92a (having N22 number of turns).

The stator coil 91a is wound around both the stator tooth 71a and the stator tooth 72a, causing the two wound parts to generate magnetic fields having polarities opposite to each other. Similarly, the stator coil 92a is wound around both the stator tooth 72a and the stator tooth 73a, causing the two wound parts to generate magnetic fields having polarities opposite to each other. Further, when the stator coils 91a and 92a are supplied with currents having the same phase, the two parts in the stator tooth 72a wound with the stator coils 91a and 92a each generate magnet fields having the same polarity.

Regarding the number of turns of the stator coils 91a and 92a the following relations are satisfied.

$$N1 = N2$$

$$N21 = N22 = (N1)/\{2\cos(\Pi/9)\}$$

With the above relations satisfied, the maximum flux values produced in the stator teeth 71a, 72a, and 73a may be equalized. Although in this description the equal signs = are used for convenience, it is often difficult to equalize actual values perfectly. Accordingly, the equal signs on the above even include equality to the extent that, if right-hand side becomes a decimal, the nearest integer to the decimal can be adapted. Furthermore, the equal signs include equality within a range of an ignorable degree of design errors.

Other two stator teeth groups 48b and 48c positioned on either side of the stator teeth group 48a of FIG. 15 also have the similar structure to the stator teeth group 48a.

Figure 16:
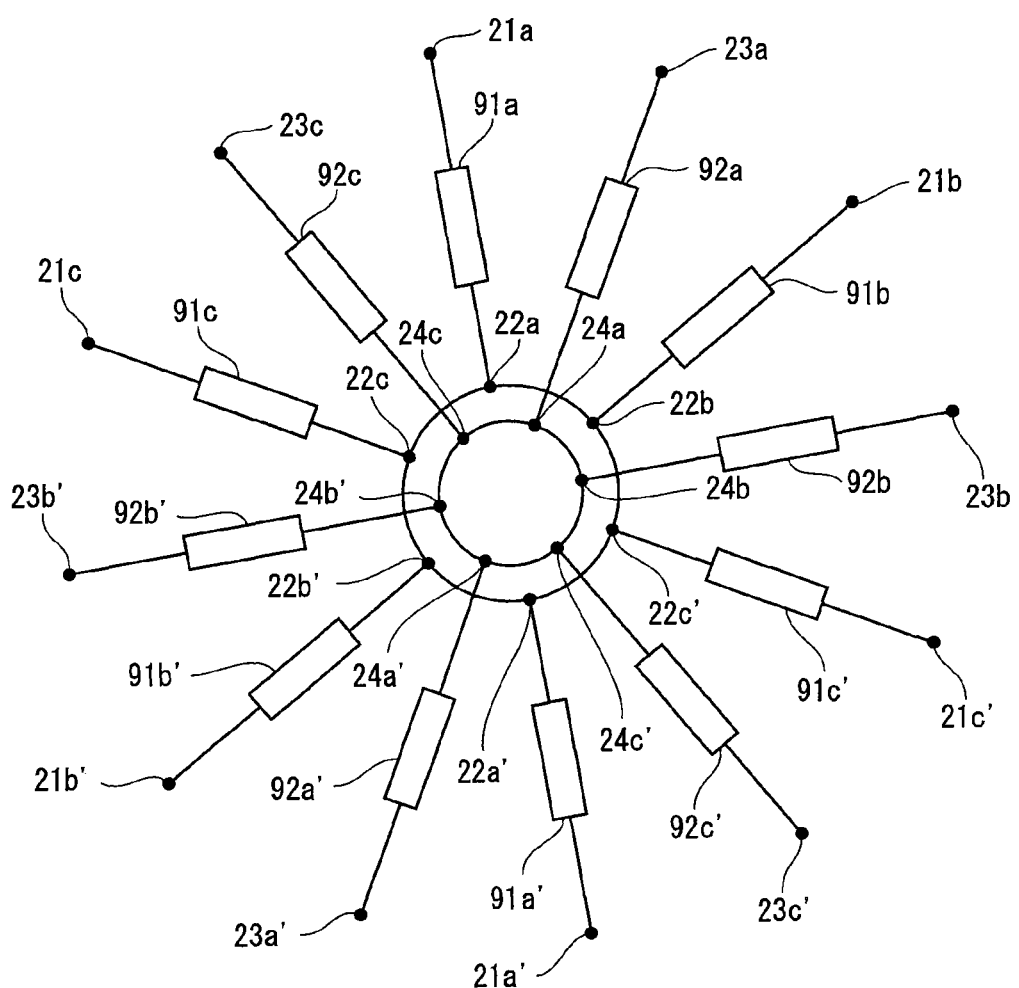
FIG. 16 is a view illustrating stator coil connections of the synchronous motor of FIG. 15.

FIG. 16 is a view illustrating stator coil connections of the synchronous motor of FIG. 15.

The alphabets a, b, and c following the reference signs of stator coil terminals shown in the figure correspond to coils belonging to the stator teeth groups 48a, 48b, and 48c, respectively.

The two stator coils 91a and 92a belonging to the stator teeth group 48a respectively have coil terminals 21a and 23a. The coil terminals 21a and 23a separately extend outside to be connected to connection terminals of the inverters, namely, driving devices. Similarly, two coil terminals 21b and 23b in the stator teeth group 48*b* and two coil terminals 21*c* and 23*c* in the stator teeth group 48*c* separately extend outside to be connected to connection terminals of the inverters, namely, driving devices.

Additionally, stator coil terminals in different stator teeth groups 48*a*, 48*b*, and 48*c* are connected to common neutral points in such a manner that the connected terminals have a phase difference of 2Π/3 radians with each other. More specifically, coil terminals 22*a*, 22*b*, and 22*c* are connected to the first neutral point. Coil terminals 24*a*, 24*b*, and 24*c* are connected to the second neutral point. Although in this example the first and second neutral points are electrically separated, these may be electrically connected.

Further, in the present embodiment there are two stator teeth groups 48*a*, two stator teeth groups 48*b*, and two stator teeth groups 48*c*. Teeth groups with the same one of the alphabets a, b, and c each have the same positional relations with respect to the magnetic poles of the rotor in terms of electrical angle. Accordingly, it is possible to cause three consecutive groups among six stator teeth groups to have a neutral point connection. It is also possible to cause three alternately arranged stator teeth groups to have a neutral point connection. It is even possible to cause all six stator teeth groups to have a neutral point connection.

This concludes the description of the structure of the synchronous motor 44. As mentioned above, 18 stator teeth are arranged at different intervals from the magnetic poles of the rotor. Every three circumferentially consecutive stator teeth belong to one of the plurality of stator teeth groups. Three stator teeth in each stator teeth group are separately connected to independent external terminals.

The term "separate" in the description refers to a relation between stator coils belonging to a single stator teeth group, and does not refer to a relation between stator coils belonging to different stator teeth groups. Accordingly, stator coils belonging to different stator teeth groups may be commonly connected if condition permits. For example, the stator coil 91*a* in the stator teeth group 48*a* and the stator coil 91*a*' in the stator teeth group 48*a*' may be connected to a common external terminal, because the stator coils are supplied with currents in the same phase. Naturally, the stator coils may be separately connected to external terminals.

The synchronous motor drive system pertaining to the present embodiment includes a drive device for supplying currents having different phases to coil terminals of the synchronous motor. A description is given below of the drive device and a current application method.

Figure 17:
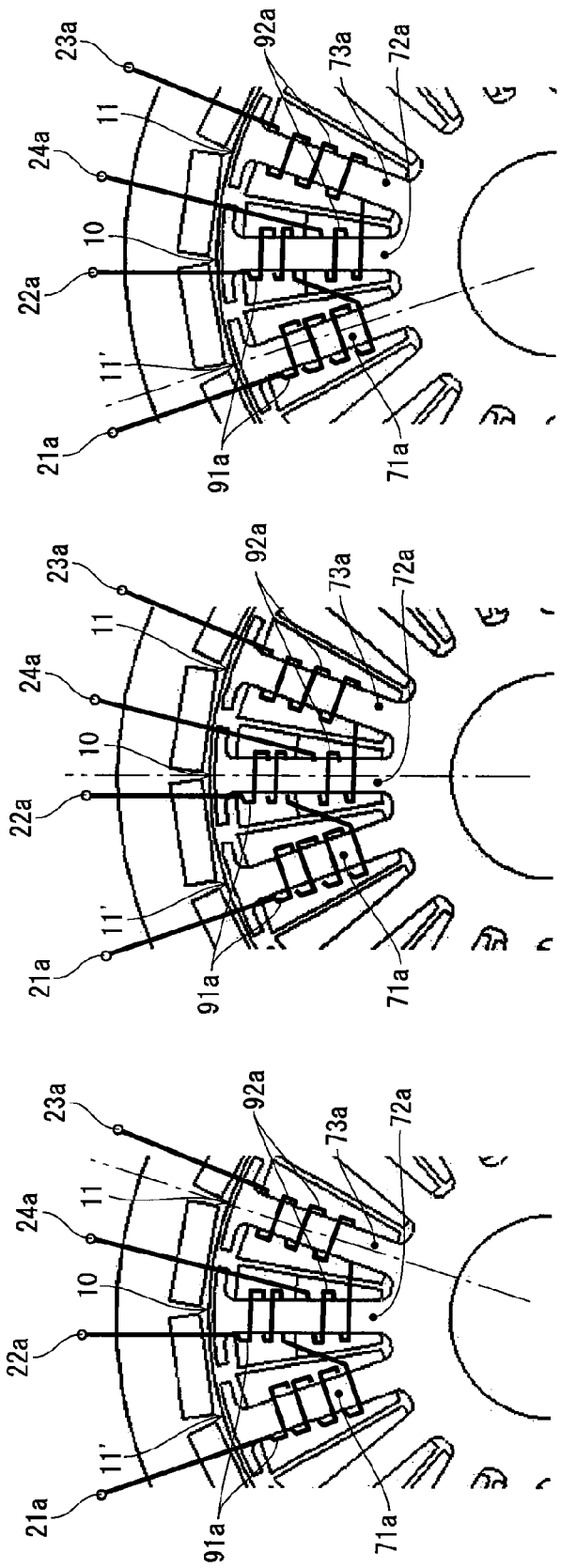
FIGS. 17A, 17B, and 17C show positional relations between a stator and a rotor pertaining to the first embodiment of the present invention.

FIG. 17 shows positional relations between the stator and the rotor pertaining to the present embodiment. FIG. 17A, FIG. 17B, and FIG. 17C show the positional relations between the stator and the rotor in each of which the rotor 2 has been rotated by mechanical degrees (i.e. Π/9 radian electrical angle) anti-clockwise. Time points indicated by (a), (b), and (c) in FIG. 19 correspond to the positional relations shown in FIG. 17A, FIG. 17B, and FIG. 17C, respectively.

In FIG. 15, points 10 and 11 between magnetic poles of the rotor are shown. The points 10 and 11 between magnetic poles indicate positions of magnetic neutral points between the N-poles and the S-poles formed by the permanent magnets 5 arranged in the rotor 2. In this embodiment, the points 10 and 11 between magnetic poles coincide mechanical positions midway between two magnets. When seen from the counterclockwise direction, an N-pole changes over to an S-pole at a point 10 between magnetic poles and an S-pole changes over to an N-pole at a point 11 between magnetic poles. Note that a point 11' between magnetic poles is the same as the point 11 between magnetic poles in terms of electrical angle, but is different from the point 11 between magnetic poles in terms of mechanical angle.

In the positional relation shown in FIG. 17A, the center of the stator tooth 73*a* and the point 11 between magnetic poles of the rotor are aligned and facing each other, as indicated by the chain line. In this positional relation, it is possible to maximize magnet torque caused by the permanent magnets by supplying currents while adjusting the current phases so as to maximize the current flowing to the stator coil 93*a*. As described with reference to FIG. 15, two consecutive magnetic poles form an angle of 18 degrees, whereas two consecutive stator teeth form an angle of 20 degrees. Due to the angle difference, in the state where the center of the stator tooth 73*a* and the point 11 between magnetic poles of the rotor are aligned and facing each other, the center of the stator tooth 72*a* and the point 10 between magnetic poles of the rotor are out of alignment. At the same time, the center of the stator tooth 71*a* and the point 11' between magnetic poles of the rotor are also out of alignment.

FIG. 17B shows the state in which the rotor 2 has been rotated by 2 mechanical degrees (i.e. Π/9 electrical radians) anti-clockwise from the state shown in FIG. 17A. As indicated by the chain line, the center of the stator tooth 72*a* and the point 10 between magnetic poles of the rotor are aligned and facing each other. In this state, the center of the stator tooth 73*a* and the point 11 between magnetic poles of the rotor are out of alignment. At the same time, the center of the stator tooth 71*a* and the point 11' between magnetic poles of the rotor are also out of alignment.

FIG. 17C shows the state in which the rotor 2 has been rotated by 2 mechanical degrees (i.e. Π/9 electrical radians) anti-clockwise from the state FIG. 17B. As indicated by a chain line, the center of the stator tooth 71*a* and the point 11' between magnetic poles of the rotor are aligned and facing each other. In this positional relation, it is possible to maximize magnet torque caused by the permanent magnets by supplying currents while adjusting the current phases so as to maximize the current flowing to the stator coil 91*a*. In this state, the center of the stator tooth 73*a* and the point 11 between magnetic poles of the rotor are out of alignment. At the same time, the center of the stator tooth 72*a* and the point 10 between magnetic poles of the rotor are also out of alignment.

Thus, at time points in which the positional relations of FIG. 17A and FIG. 17C are established, namely in which the centers of the stator teeth 71*a* and 73*a* are facing magnetic poles of the rotor, currents are supplied by adjusting the current phases so as to maximize the current supplied to one of the stator coils 91*a* and 92*a* in each time point. By doing so, the current supplied to the stator coil 92*a* is maximized when the positional relation shown in FIG. 17A is established, namely in which the center of the stator tooth 73*a* and the point 11 between magnetic poles of the rotor are aligned and facing each other. Accordingly, magnet torque generated by the stator teeth 73*a* is maximized. Similarly, when the positional relation shown in FIG. 17B is established, namely in which the center of the stator teeth 72*a* and the point 10 between magnetic poles of the rotor are aligned and facing each other, vector synthesis of the currents supplied to the stator coils 91*a* and 92*a* is maximized and magnet torque generated by the stator teeth 72*a* is maximized. Further, when the positional relation shown in FIG. 17C is established, namely in which the center of the stator teeth 71*a* and the point 11 between magnetic poles' of the rotor are aligned and facing each other, the current supplied to the stator coil 91*a* is maximized and magnet torque generated by the stator teeth 71a is maximized. As a result, magnet torque may be maximized in each stator tooth, whereby the overall torque is increased.

Figure 19:
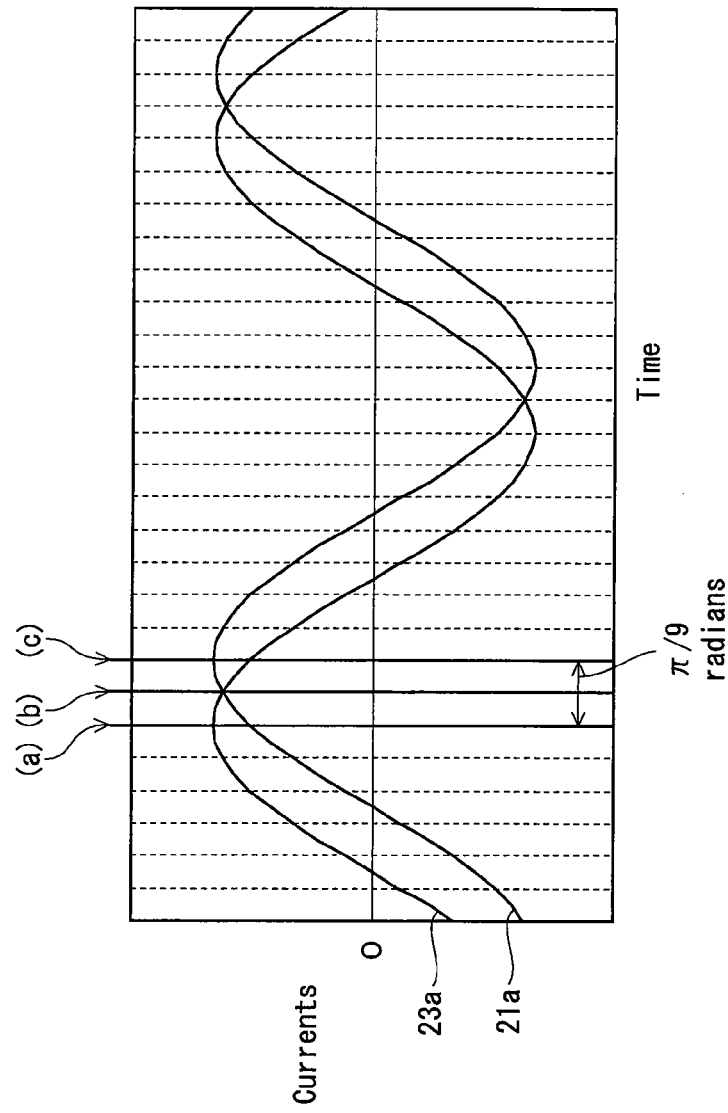
FIG. 19 shows temporal transitions of currents applied to stator coils in the first modification.

In FIG. 19, the vertical axis represents the currents supplied to the coil terminals 21a and 23a (of the stator coils 91a and 93a), while the horizontal axis represents time. As shown in FIG. 19, with respect to the current supplied to the coil terminal 21a, the current supplied to the coil terminal 23a is advanced by 2Π/9 radians.

Between the arrangement relation among the stator coils and the currents supplied to the stator coils, there is the following relation.

With respect to the stator coil 72a, the stator tooth 73a is arranged with an additional offset of −Π/9 radians besides an offset of Π electrical radians. With respect to the stator coil 72a, the stator tooth 71a is arranged with an additional offset of +Π/9 radians besides an offset of Π electrical radians. Regarding such an arrangement relation, the current supplied to the stator coil 92a is advanced by 2Π/9 radians with respect to the current supplied to the stator coil 91a.

As described above, in the synchronous motor drive system of the present modification, a gate control signal is output which determines, for each of the two inverters, the current phase angle β and the current amount Ia of the current to output with use of a map data table for each inverter. This increases torque generated in the synchronous motor 44 while suppressing the torque ripple.

Modification 2 of the First Embodiment

Figure 20:
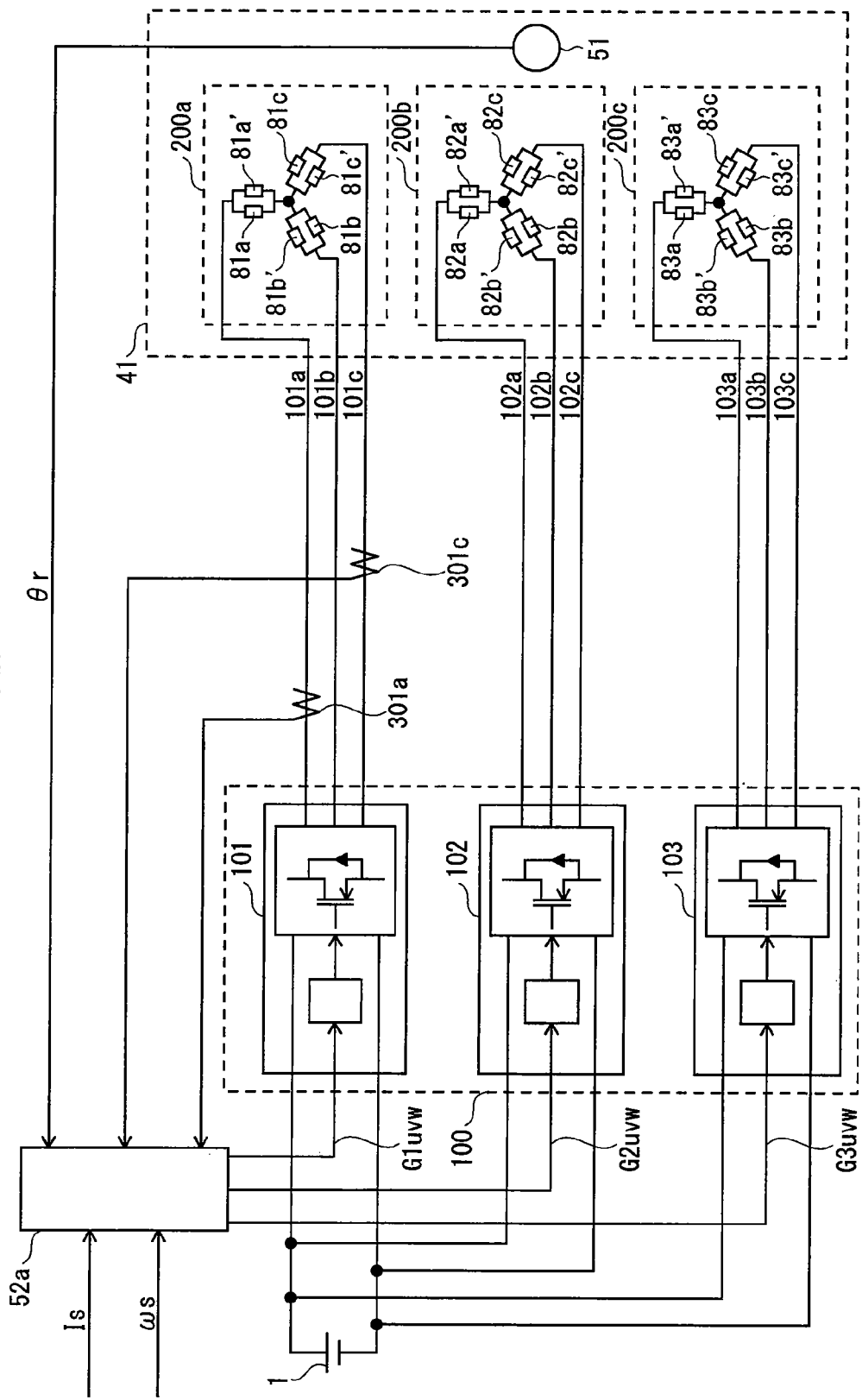
FIG. 20 shows an overall structure of a synchronous motor drive system pertaining to a second modification.

FIG. 20 shows an overall structure of a synchronous motor drive system pertaining to a second modification. The synchronous motor drive system shown in the figure differs from FIG. 1 in the following two points. One is that the current application control unit 52 is replaced with the current application control unit 52a. The other is that the current detectors 302a, 302c, 303a, and 303c are removed.

The current application control unit 52 of the synchronous motor drive system shown in FIG. 1 performs feedback control of each of the inverters 101, 102, and 103, while checking the operation condition of each inverter by monitoring the current value and the current phase in a corresponding power wiring.

However, in synchronous motors including a plurality of three-phase coils, generally, current amounts and current phases are estimated with respect to all the three-phase coils according to the structure of the synchronous motor, simply by monitoring a current amount and a current phase with respect to a single three-phase coil.

In view of above, the current application control unit 52a according to the second modification performs feedback control of each inverter as follows. The current application control unit 52a monitors the current amount and the current phase of a power wiring corresponding to the inverter 101 in the current detectors 301a and 301c. With use of the monitored current amount and the current phase, the current application control unit 52a estimates the current amount and the current phase of a power wiring corresponding to each of the inverters 102 and 103. The estimation of the current amounts and the current phases is done easily by utilizing on voltages of the switching devices constituting the inverters.

With the above structure, the number of the current detectors is reduced, whereby the overall cost of the system is reduced.

Modification 3 of the First Embodiment

A description is given below of a modification of the control in the current application control unit 52. In the modification below, the current application control unit 52 performs a different control from the first embodiment in the similar structure to the synchronous motor drive system of FIG. 1.

Figure 21:
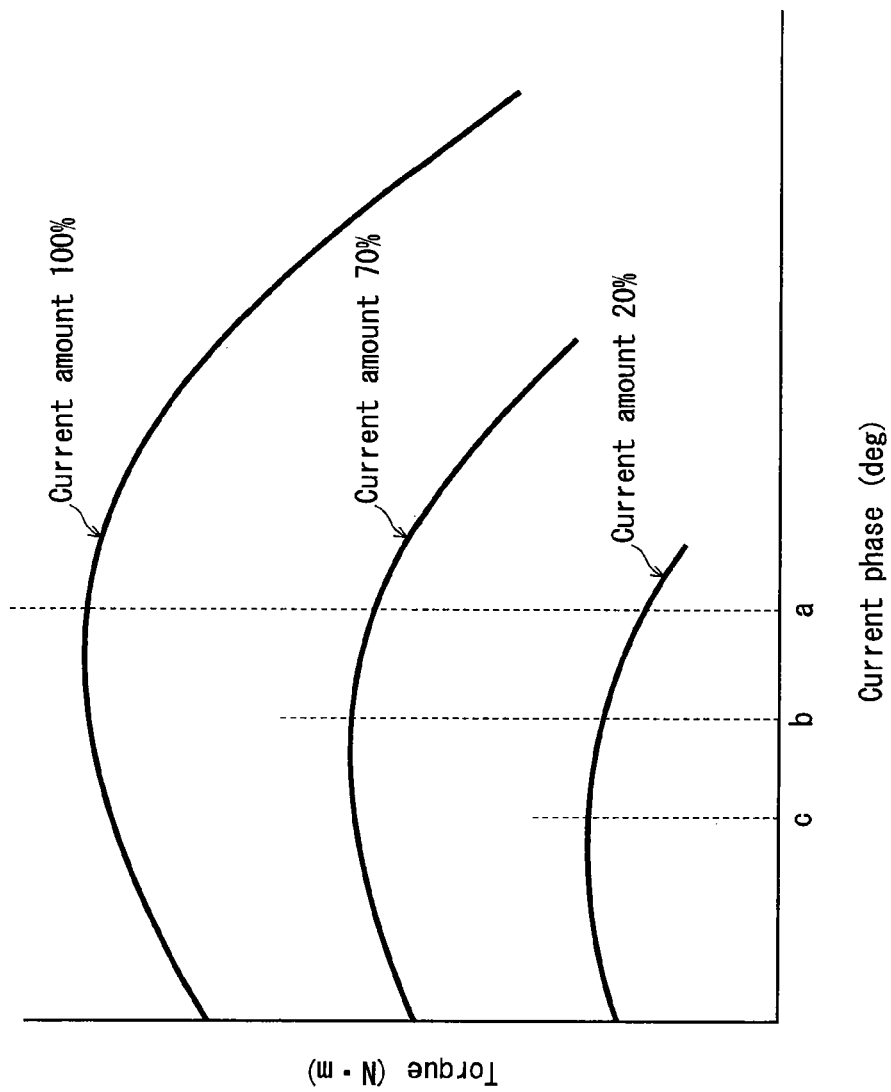
FIG. 21 shows relations between current phase and torque obtained for a variety of currents.

FIG. 21 shows relations between current phase and torque obtained for a variety of currents. It is assumed that the current amount obtained in the FIG. 11 example is 100%. The figure shows the relations between current phase and torque obtained for the current amounts of 100%, 70%, and 20%. As shown in the figure, the maximum torque amounts are obtained at different current phases a, b, and c for the current amounts of 100%, 70%, and 20%, respectively.

A map data table shown in FIG. 22 is generated by the following processes: measuring, in the manufacturing process, the above relations of the current amounts, the current phases, and the torque amounts generated in the synchronous motor 1; and bringing each torque amount into correspondence with a current amount and a current phase, which are normalized with respect to a standard torque value obtained for a current amount of 100% and a current phase of 0 degree.

In the present modification, the current application control unit 52 holds such a map data table in the internal ROM. In the determination of the current amount and the current phase for each of the inverters 101, 102, and 103, the current application control unit 52 selects a current amount and a current phase that correspond to the same normalized torque value in the map table. This is to equalize the torque generated by the three-phase alternating current output from each inverter.

For example, a description is given of the case in which the synchronous motor is driven at a normalized torque value of 0.8. In this case, the current application control unit 52 causes: the inverter 101 to output a three-phase alternating current of a current amount of 100% and a current phase of −20 degrees; the inverter 102 to output a three-phase alternating current of a current amount of 80% and a current phase of 0 degree; and the inverter 103 to output a three-phase alternating current of a current amount of 60%; and a current phase of +20 degrees. This equalizes the torque amounts generated in the three-phase coil groups each supplied with the three-phase currents from the inverters, thereby suppressing the torque ripple generated in the synchronous motor as a whole.

Modification 4 of the First Embodiment

Figure 23:
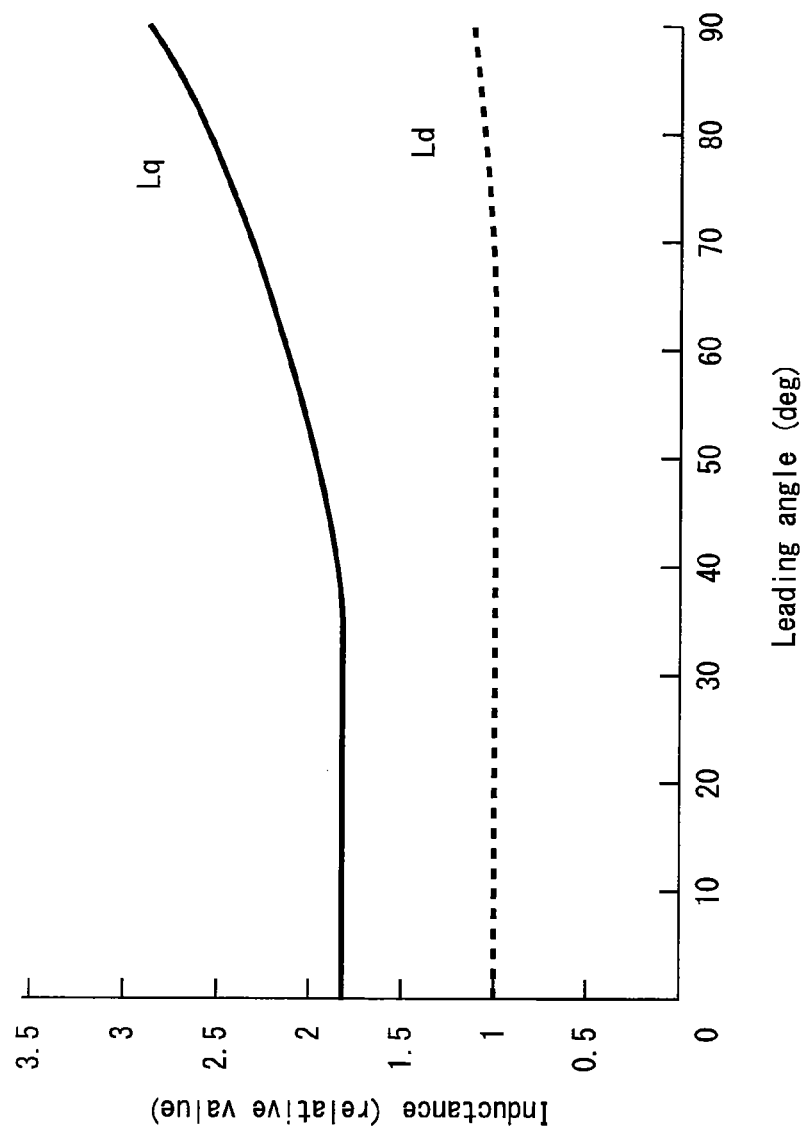
FIG. 23 shows a relation between a leading angle of current phase from a q-axis and an inductance of stator coil.

FIG. 23 shows a relation between a leading angle of the current phase from a q-axis and an inductance of the stator coil. As shown in the figure, there are small fluctuations of a q-axis component of inductance Ld with respect to the leading angle. On the other hand, there are large fluctuations of a q-axis component of inductance Lq with respect to the leading angle. As the leading angle increases, a difference between Lq and Lq increases.

Nevertheless, due to manufacturing reasons it is difficult to completely homogenize all the stator coils in the synchronous motor. It therefore should be noted that the inductance characteristics of the stator coil as shown in FIG. 23 vary from one stator coil to another.

Generally speaking, torque generated in an interior permanent magnet synchronous motor is given by the following formula.

$$T=Pn\{\phi a \cdot Iq+(Lq-Ld)Id \cdot Iq\} \quad \text{[Formula 2]}$$

In the above formula, the first term on the right-hand side represents magnet torque and the second term on the right-hand side represents reluctance torque. It can be understood from the above formula that the reluctance torque is influenced by the difference between Lq and Lq. Note that the inductance of each stator coil in the synchronous motor is not always homogeneous, as described above.

In view of above, the current application control unit 52 in the present modification calculates the inductance of each of the coil groups 200a, 200b, and 200c based on the change rates of the currents detected in the current detectors 301a, 301c, 302a, 302c, 303a, and 303c. In order to determine the instructing values separately for the inverters 101, 102, and 103, the current application control unit 52 calculates the current amounts according to the calculated inductance so that torque amounts generated in the coil groups are equalized under the above torque formula.

According to the present modification, the inductance value of each coil group is calculated based on the change rates of the corresponding currents during the operation of the synchronous motor. The calculated value is fed back for the determination of the instructing value for each inverter. As a result, high robustness is obtained.

Modification 5 of the First Embodiment

A description is given of a modification in which the current amounts are determined according to numbers of turns of the stator coils.

In the present modification, the stator teeth 61a, 62a, and 63a belonging to one stator teeth group in the synchronous motor 1 are wound with the stator coils each having different numbers of turns.

More specifically, the stator coil 81a has N number of turns, the stator coil 82a has 2N number of turns, and the stator coil 83a has N number of turns, as shown by FIG. 3.

In the structure provided with the above synchronous motor in this modification, the current application control unit 52 determines the current amount for each inverter as follows. The determination is made so that the proportion of the amounts of the three-phase alternating current output from the inverter 101 to apply to the stator coil 81a, the current from the inverter 102 to apply to the stator coil 82a, and the current from the inverter 103 to apply to the stator coil 83a become 2:1:2.

This equalizes the magnet torque generated in all the coil groups supplied with the three-phase alternating currents from the corresponding inverters. Accordingly, the torque ripple generated in the synchronous motor as a whole is suppressed. In the present modification, the following effect is also achieved. The stator coil 82a, although positioned in the middle and therefore tending to produce the greatest amount of heat, is supplied with the smaller amount of current than the other stator coils in the stator teeth group. Accordingly, the amount of heat produced by the stator coil 82a itself is suppressed.

Modification 6 of the First Embodiment

A description is given below of a modification in which operation safety of the synchronous motor drive system is improved.

In the present modification, the inverters 101, 102, and 103 each detect voltages, currents, and heat of the internal switching devices in the similar structure to the synchronous motor drive system of FIG. 1. If any of the detected voltages, currents, and heat is in an overload state (i.e. exceed predetermined overload threshold values), the operations of the inverters are temporarily or permanently halted.

In addition to performing the control described in the first embodiment, the current application control unit 52 further monitors the inverters 101, 102, and 103. In the case in which the operation of at least one inverter is halted, the current application control unit 52 controls the remaining inverters. The control is made so that the torque to be generated by a coil group corresponding to the inverter whose operation is halted, is generated by the remaining three-phase coil groups instead. In this modification, it is preferable to temporarily disable the halt function using the overload threshold values on the remaining inverters. The above control realizes it to prevent the unstable condition of the synchronous motor drive system and maintain the operation thereof.

Thus, in the case in which the operation of at least one inverter is halted, the remaining inverters are controlled to compensate for the torque to be generated by the inverter. This also prevents the unstable condition of the synchronous motor drive system and an additional damage to apparatuses connected with the synchronous motor drive system.

The synchronous motor drive system according to the present modification may be used in auxiliary systems, such as electrical power steering and an electrical brake as they require high reliability. Consequently, even if at least one of the plurality of inverters breaks down, the drive system remains operated by the remaining unbroken inverters.

Meanwhile, the current application control unit 52 may take a control method other than the above. For example, in the case in which the operation of at least one inverter is halted while monitoring the inverters 101, 102, and 103, the current application control unit 52 may halt the operations of the remaining inverters as well.

Second Embodiment

Figure 24:
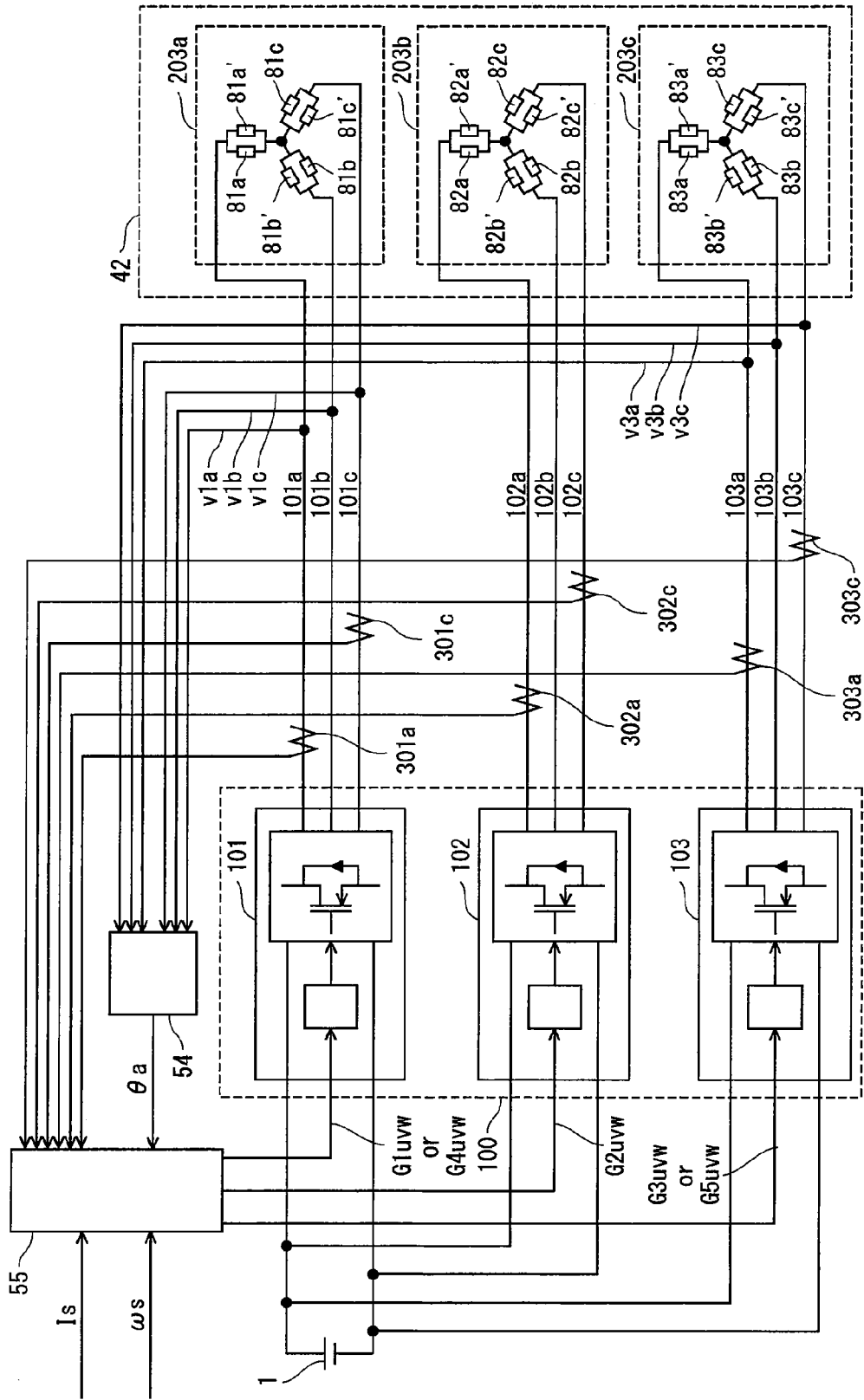
FIG. 24 shows an overall structure of a synchronous motor drive system pertaining to a second embodiment of the present invention.

FIG. 24 shows an overall structure of the synchronous motor drive system pertaining to the second embodiment of the present invention. The structure of the synchronous motor drive system shown in FIG. 24 differs from FIG. 1 in the following two points. One is that the synchronous motor 41 and the current application control unit 52 are replaced with a synchronous motor 42 and a current application control unit 55, respectively. The other is that a position detector 54 is added. A description is given further below of the structural differences from the synchronous motor drive system pertaining to the first embodiment.

The position detector 54 sequentially measures changes of induced field voltages generated in the coils belonging to the coil groups 203a and 203c on each rotation of the rotor. The position detector 54 then specifies the position of the rotor according to the detected induced field voltages. The line voltages in the coil groups 203a and 203c are measured in current non-applied part (which will be described later) in which no current is supplied from the inverters 101 and 103, while the inverters 101 and 103 are operating in square wave current application mode. In conventional motor structures, position detection resolution capability of a position detection signal according to line voltage is approximately 60 electrical degrees. On the other hand, in the structure of the synchronous motor drive system according to the present invention, the motor includes a plurality of independent coil groups. Accordingly, the position detection resolution of a position detection signal is improved. Further, by combining the line voltages measured in the coil groups to use them as a position detection signal, the position detection resolution is even more improved. The above structure realizes a reliable detection of the position of the rotor, and optimal flux weakening control appropriate to the position.

The synchronous motor 42 includes coil groups 203a, 203b, and 203c each composed of three-phase coils.

Figure 25:
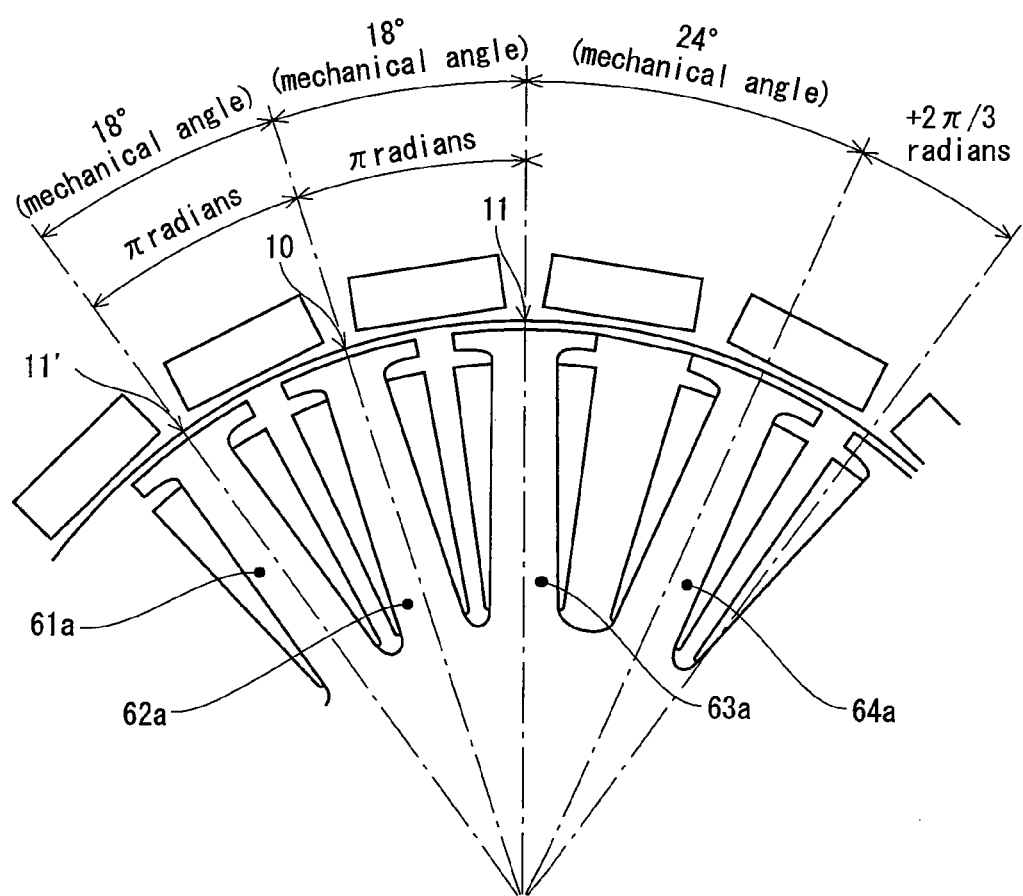
FIG. 25 is a detail view of a synchronous motor 42.

FIG. 25 is a detail view of the synchronous motor 42. The description below discusses mechanical angles between stator coils. Note that the mechanical angles are angles between centers of the stator teeth wound with the respective stator coils (the centers of the stator teeth are represented in chain lines).

The synchronous motor 42 differs from the synchronous motor of FIG. 3 in the intervals disposed between three stator teeth 61a, 62a, and 63a. In the synchronous motor 42, the three stator teeth 61a, 62a, and 63a belonging to a stator teeth group are arranged at equal intervals of 18 mechanical degrees. Two consecutive stator teeth groups are arranged with an offset of 60 mechanical degrees, that is, +2Π/3 electrical radians. Accordingly, with respect to the stator tooth 63a, a stator tooth 64a belonging to the consecutive stator teeth group is positioned at 24 mechanical degrees. With the above structure, stator teeth belonging to the same group each have the same phase shift with respect to the respective magnets facing to the stator teeth. In the example shown in FIG. 25, the centers of the stator teeth 61a, 62a, and 63a are each aligned with points between magnetic poles.

Figure 26:
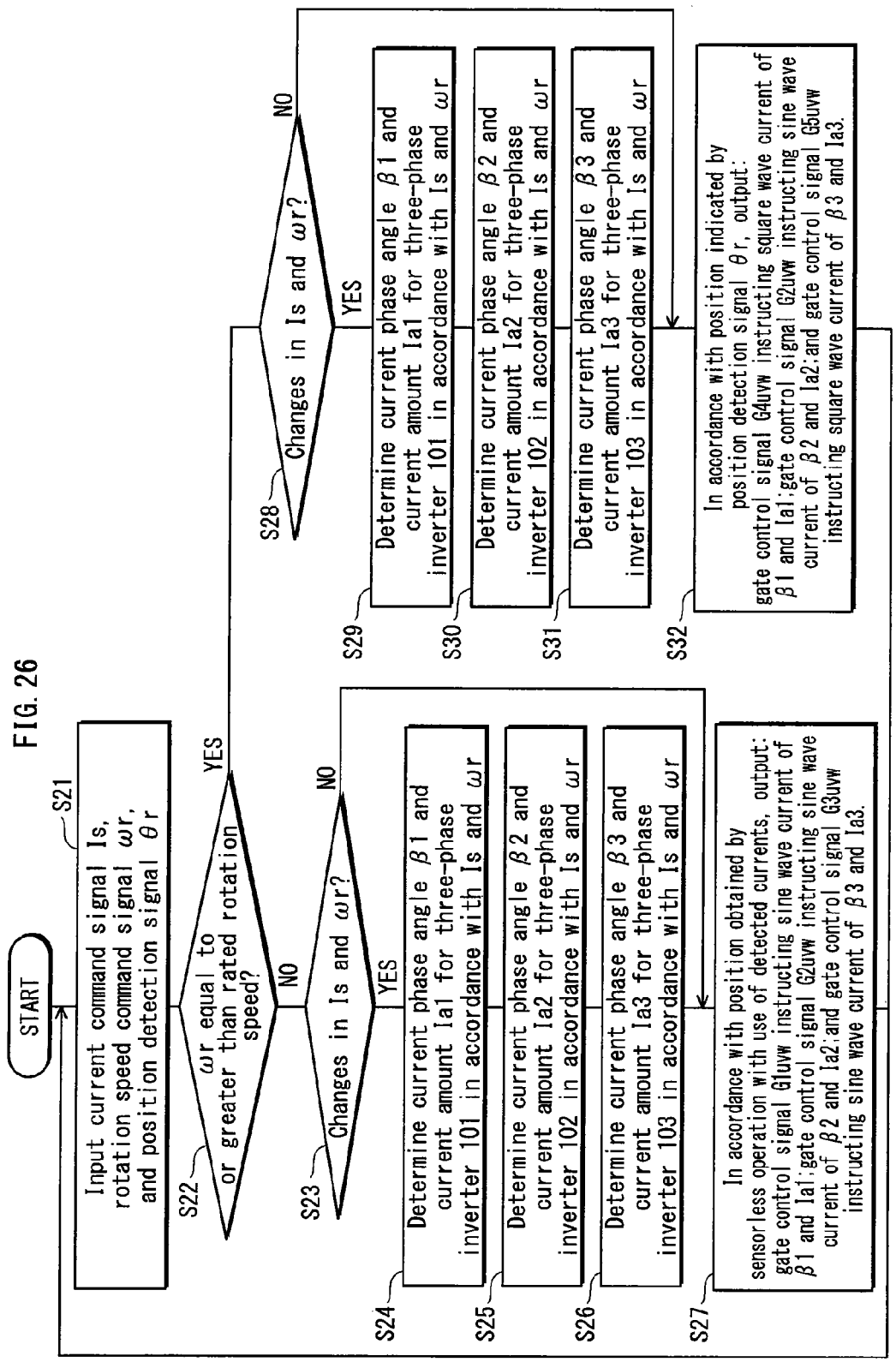
FIG. 26 is a flowchart showing procedures of inverter control processing in a current application control unit 55.

Next, a description is given of the current application control unit 55. The current application control unit 55 holds a plurality of map data tables in correspondence with the inverters 101, 102, and 103. Each map data table indicates three-phase alternating currents that the current application unit 55 causes the corresponding inverter to output in response to various values of the current command signal Is and the rotation speed command signal ωr. Each three-phase alternating current is indicated in correspondence with a current phase angle β and a current amount Ia. The current application control unit 55 operates by referring to the map data tables. In particular, with reference to FIG. 26, a description is given of the event of driving the synchronous motor at a rotation speed less than a rated rotation speed (NO in Step S22). Like the current application control unit 52 in the first embodiment, the current application control unit 55 outputs the gate control signals G1uvw, G2uvw, and G3uvw to the inverters 101, 102, and 103, respectively (Step S27). The gate control signals G1uvw, G2uvw, and G3uvw instruct the inverters 101, 102, and 103 to operate in sine wave current application mode in which currents are applied throughout a period of 2Π electrical radians. The position of the rotor used in this case is obtained from a conventional sensorless operation with use of the change rates of the currents detected in the current detectors 301a, 301c, 302a, 302c, 303a, and 303c.

On the other hand, a description of given of the event of driving the synchronous motor at a rotation speed greater than or equal to the rated rotation speed (YES in Step S22). The gate control signal G2uvw is output to the inverter 102 to instruct the inverter 102 to operate in the sine wave current application mode in which current is applied throughout the period of 2Π electrical radians. On the other hand, gate control signals G4uvw and G5uvw are output to the inverters 101 and 103 to instruct the inverters 101 and 103 to operate in the square wave current application mode in which currents are applied only in part of the period of 2Π electrical radians (Step S32). In response to the gate control signals G4uvw and G5uvw, the inverters 101 and 103 outputs the currents in the square wave current application mode. Generally speaking, in the square wave current application mode, each current non-applied part corresponds to an 60 electrical degrees, and each current applied part corresponds to 120 electrical degrees. The current non-applied part and the current applied part alternately occur in the period of 2Π electrical radians. Meanwhile, in the case of driving the synchronous motor at a rotation speed greater than or equal to the rated rotation speed, the position of the rotor is not obtained from the sensorless operation with use of the change rates of the currents. The position of the rotor used in this case is specified by the position detector 54, based on induced field voltages generated in the coils belonging to the coil groups 203a and 203c that are respectively connected to the inverters 101 and 103.

Figure 27:
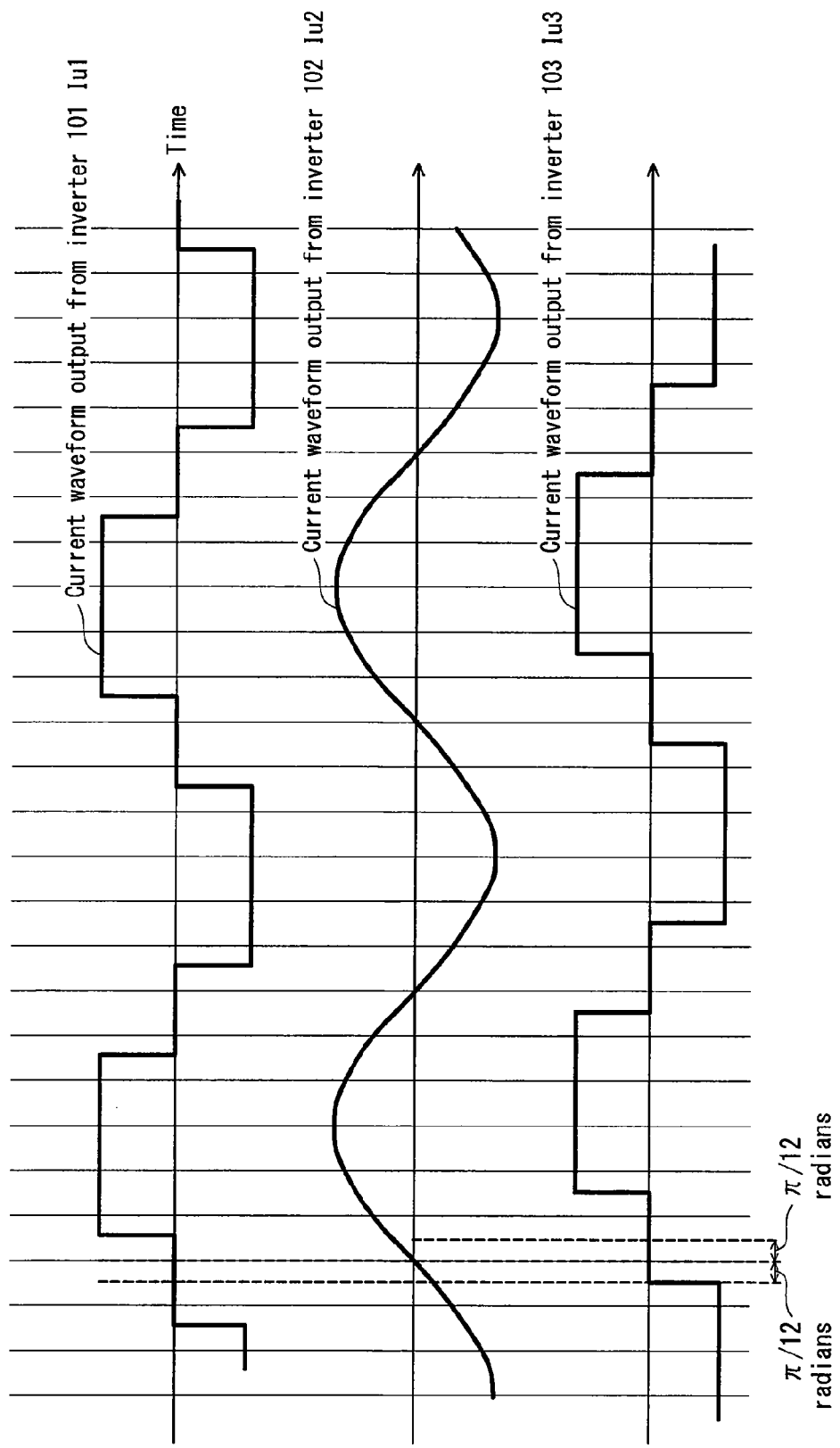
FIG. 27 shows transitions of currents applied to stator coils over time in the case of driving at a rotation speed greater than or equal to a rated rotation speed.

FIG. 27 shows temporal transitions of currents applied to stator coils in the case of driving the synchronous motor at a rotation speed greater than or equal to a rated rotation speed. In FIG. 27, the vertical axis represents the currents supplied from the inverters 101, 102, and 103, while the horizontal axis represents time. As shown in FIG. 27, the current output from the inverter 102 has a sinusoidal waveform, whereas the currents output from the inverters 101 and 103 have square waveforms. Note that the current supplied from the inverter 103 is 2Π/12 radians (i.e. 30 degrees) behind the current supplied from the inverter 101.

Generally speaking, in motors driven by the square wave current application mode, torque ripples are extremely higher compared with motors driven by the sine wave current application mode. Accordingly, the torque ripples cause significant problems, such as vibration and noise, in the motors driven by the square wave current application mode. However, the synchronous motor system according to the present embodiment includes the current application control unit 55 that is capable of selectively outputting, in one time, (i) the gate control signal instructing one of the inverters to operate in the sine wave current application mode in which current is applied throughout the period of an electrical angle and (ii) the gate control signal instructing one of the inverters to operate in the square wave current application mode in which current is applied only in part of the period of an electrical angle. In this embodiment, at least two of the plurality of inverters operate in the square wave current application mode in response to the output from the current application control unit 55. Accordingly, it is possible to control current phases individually so as to cancel the torque ripples generated by the outputs from the at least two inverters operated in the square wave current application mode. There is a current phase difference of 30 degrees between the current output from the inverter 101 and the current output from the inverter 103. Therefore, the torque ripples each having a period of 60 degrees are canceled by each other. As a result, the torque ripple generated in the synchronous motor as a whole may be suppressed.

Further, in the inverters operated in the square wave current application mode, current is not applied apart from during the current-applied part. During the current non-applied part, the induced field voltages generated in the coils belonging to each coil group may be measured, and the position of the rotor may be detected according to the line voltages. As a result, the present embodiment provides the synchronous motor drive system with reduced vibration and noise and with an improved efficiency. Moreover, since the number of position detectors is decreased, the cost of the synchronous motor drive system is reduced.

This concludes the description of the current application control unit 55.

Meanwhile, inside each inverter, switching devices perform high-frequency switching operations to generate a three-phase alternating current according to the electrical frequency. The electrical frequency increases in proportion to the rotation speed of the rotor. Therefore, the higher the rotation speed of the rotor becomes, the higher the required switching frequency is. Conversely, as long as the rotation speed of the rotor is low, only a relatively low switching frequency is required. In this case, the switching loss may be reduced in each inverter. Further, high-frequency noise is also reduced. However, there is the following problem in the case of driving at a low speed. If current is supplied in a current application mode in which the current is supplied only in part of the period (e.g. in the square wave current application mode), the influence of noise, vibration, and such accompanied by the rotation of the synchronous motor can become prominent.

To address the above problem, the current application control unit 55 in the present embodiment is configured to switch the control when the rotation speed reaches a threshold, that is, the rated rotation speed. Specifically, if the rotation speed is less than the rated rotation speed, that is, within the regular range, the current application control unit 55 controls inverter operations with the first gate control signals. The first gate control signals instruct the sine wave current application mode in which vibration and noise is reduced. On the other hand, if the rotation speed is greater than or equals to the rated rotation speed, and increase and decrease of the rotation speed is required in short-time operations, the current application control unit 55 controls inverter operations with the second gate control signals. The second gate control signals instruct the square wave current application mode.

Consequently, when the rotation speed of the rotor is low, all the inverters are operated in the sine wave current application mode. Because of the low rotation speed, the switching frequencies are decreased, whereby the switching losses are reduced. Further, current and change rate of the current are detected for each switching frequency in this embodiment. This reduces loads on microcomputers or the like to perform position sensorless operations (although a detailed explanation is not given of the position sensorless operation in this description, the following is generally argued. As switching frequencies increase, loads on the microcomputers increase, thereby affecting the sensorless control).

On the other hand, when the rotation speed of the rotor is high, two inverters are operated in the square wave current application mode. This decreases the switching frequencies even in driving at a high speed and reducing the switching losses in the inverters. Further, in this embodiment the position of the rotor may be detected by detecting induced field voltages generated in the coils that are supplied with currents in the square wave current application mode. As a result, the need for expensive high-precision position sensors is omitted, and they may be replaced with relatively inexpensive low-precision position sensors. In this case, there is no danger of malfunction due to possible breakdown of the position sensors, whereby reliability of the system as a whole is improved. Thus, the present embodiment enables reducing cost, vibration, and noise, while improving efficiency and reliability of the synchronous motor drive system.

As mentioned above, by adapting current modes appropriate to the driving conditions of the motor, highly efficient, inexpensive, and highly reliable synchronous motor drive system is realized. Such a synchronous motor drive system may serve the uses in which noise must be reduced during driving at a high rotation speed, and loads of positional sensorless operation should be reduced.

Meanwhile, in the above-described second embodiment, the sine wave current application mode is used as the first current application mode in which current is applied throughout the period of an 2Π electrical radians. Further, the square wave current application mode is used as the second current application mode in which current is applied only in part of the period of 2Π electrical radians. However, the first and second current application modes are not limited to those examples. For example, as the first current application mode, another current application mode may be used in which a current having variable periods instead of a regular sine waveform is applied. As the second current application mode, wide-angle current application mode may be used.

Further, although in the description of the second embodiment the number of position detectors is reduced, it is also possible to use simplified position detectors along with the position detection method according to the induced field voltages. In this case, relatively expensive position detectors, such as optical encoders and resolvers, may be replaced with hall devices and the like. This reduces the cost of the position detectors and improving position detection accuracy, thereby reducing the cost and improving the performance of the synchronous motor drive system.

Third Embodiment

The switching devices (e.g. IGBTs and MOSFETs) and diodes inside the inverter are Si devices. However, by changing the Si devices to SiC (Silicon Carbide) devices and GaN (Gallium nitride-based) devices, switching losses may be significantly reduced. As a result, the need for cooling devices and heat dissipation fins of the inverters is omitted. Further, the SiC and GaN devices have higher heat resistance characteristics than the Si devices. For this reason, there is likely to be more flexibility in device layout. The miniaturization of the cooling devices and the improvement of heat resistance of the inverters themselves enables the inverters to be disposed in the proximity of the coils of the motor. As a result, impedance of cables connecting the inverters and the motor is significantly reduced. This also suppresses the generation of excessive surge voltages due to the influences of the impedance of the cables and of high-speed switching.

Fourth Embodiment

Figure 28:
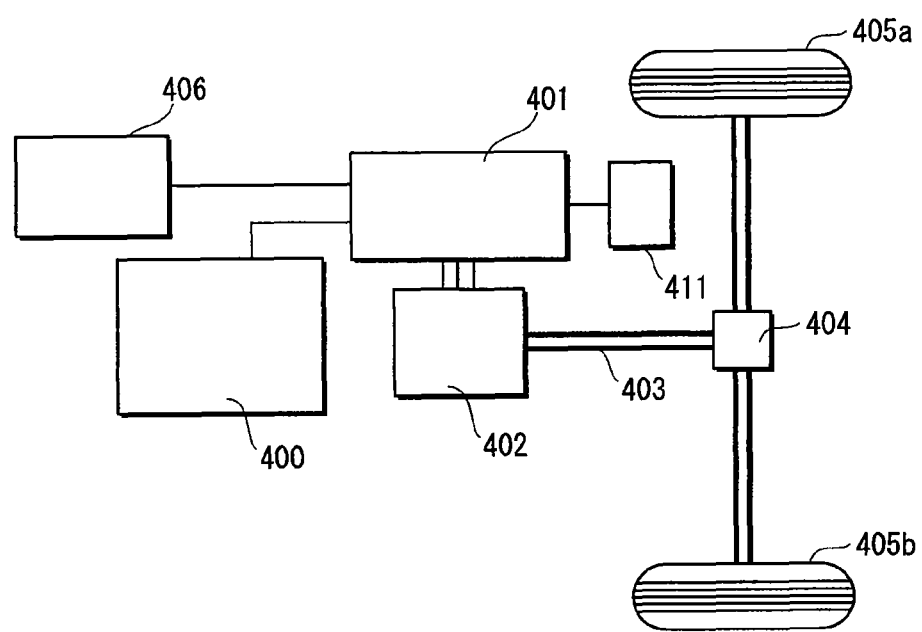
FIG. 28 shows a schematic structure of an electrical vehicle mounted with the synchronous motor drive system of the present invention.

First of all, a description is given of an overall structure of an electrical vehicle mounted with the synchronous motor drive system of the present invention. FIG. 28 shows a schematic structure of the electrical vehicle mounted with the synchronous motor drive system of the present invention.

The major part of the electrical vehicle pertaining to the present embodiment is mainly composed of a main battery 400, an inverter module 401, a motor 402, a drive axis 403, a differential gear 404, wheels 405a and 405b, an auxiliary buttery 406, and a current application control unit 411.

The inverter module 401 is connected to each of the auxiliary buttery 406, the main buttery 400, and the motor 402. AC power output from the main buttery 400 is DC/AC converted by the inverter module 401, and input to the motor 402 as DC power. The motor 402 converts the electrical energies supplied from the inverter module 401 to mechanical energies to generate driving power. The motor 402 is connected to the wheels 405a and 405b via the drive axis 403 and the differential gear 404. Accordingly, the rotating drive of the motor 402 causes the wheels 405a and 405b to rotate. In this way, the electrical vehicle is enabled to drive according to the operations of the motor 402.

Note that the inverter module 401, the motor 402, and the current application control unit 411 are same as those included in the synchronous motor drive system described in the first embodiment. The inverter module 401 has three three-phase inverters inside. The motor 402 includes the stator characterized in that the separate coil groups are arranged consecutive to each other to be connected to the three three-phase inverters as shown in FIG. 2. Also note that, in addition to the inverter control described in the first embodiment, the current application control unit 411 further monitors each three-phase inverter included in the inverter module 401. If occurrence of overload is detected in one of the inverters, the current application control unit 411 controls the inverter module 401. The control is made to halt the operation of the overloaded three-phase inverter, while compensating the shortage of the driving force resulting from the halt operation by the coils supplied currents from the remaining three-phase inverters.

In conventional electrical vehicles, there is only a single inverter and a single motor. If one of the inverter and the single motor goes out of order, the conventional electrical vehicle is not able to drive. In contrast, in the electrical vehicle pertaining to the present embodiment, even if one of the three-phase inverters included in the inverter module 401 goes out of order, the remaining three-phase inverters still continue to drive the motor to rotate. Accordingly, the electrical vehicle of the present embodiment is enabled to maintain the driving without interruption.

Regarding the motor 402, moreover, the structure provided with the three separate coil groups brings about the following effects. Even if one of the coil groups goes out of order, the remaining coil groups still continue to drive the motor 402. As a result, the electrical vehicle of the present embodiment is enabled to maintain the driving without interruption.

As mentioned above, by mounting the synchronous motor drive system of the present invention, the highly reliable electrical vehicle is provided. Further, compared with electrical vehicles using a plurality of motors and inverters, the cost is significantly reduced.

Besides, as another control method by the current application control unit 52, the current application control unit 52 may monitor each inverter included in the inverter module 401. In this case, if the one of the three-phase inverters goes out of order and the operation is halted, the current application control unit 52 may control the remaining three-phase inverters to halt the operations. By the control method, the electrical vehicle of the present invention coasts if the synchronous motor drive system goes out of order, thereby enabling a safe operation and stop.

First Modification of the Fourth Embodiment

Figure 29:
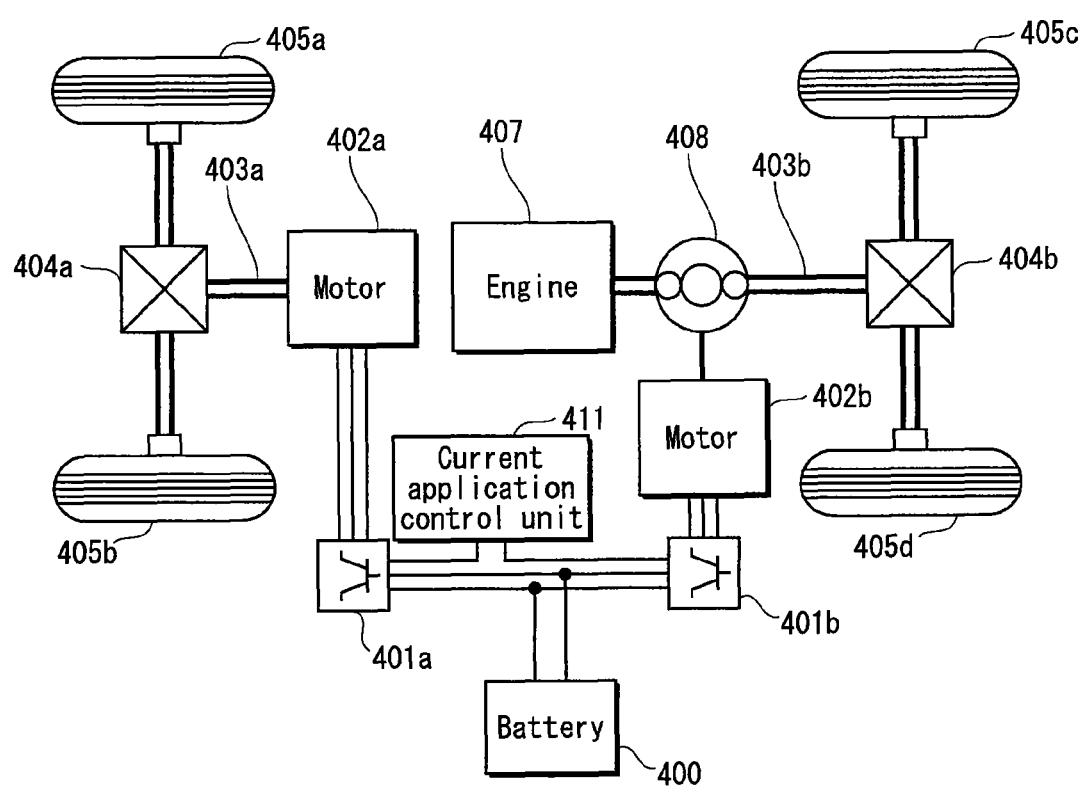
FIG. 29 shows a schematic structure of a hybrid electrical vehicle mounted with the synchronous motor drive system of the present invention.

Next, a description is given of a modification in which the synchronous motor drive system of the present invention is mounted on a hybrid electrical vehicle. FIG. 29 shows a schematic structure of the hybrid electrical vehicle mounted with the synchronous motor drive system of the present invention.

The major part of the hybrid electrical vehicle pertaining to the present embodiment is mainly composed of a main battery 400, inverter modules 401a and 401b, motors 402a and 402b, drive axes 403a and 403b, differential gears 404a and 404b, wheels 405a to 405d, an engine 407, a power dividing mechanism 408, and a current application control unit 411.

The inverter modules 401a and 401b each have three three-phase inverters inside. The inverter modules 401a and 401b are each connected to the main buttery 400 and the motors 402a and 402b. AC power output from the main buttery 400 is DC/AC converted by the inverter modules 401a and 401b, and input to the motors 402a and 402b as DC power. The motors 402a and 402b convert the electrical energies supplied from the inverter modules 401a and 401b to mechanical energies to generate driving power. The motor 402a is connected to the wheels 405a and 405b via the drive axis 403a and the differential gear 404a. The motor 402b is connected to the wheels 405c and 405d via the drive axis 403b and the differential gear 404b. Accordingly, the rotating drive of the motors 402a and 402b causes the wheels 405a to 405d to rotate. In this way, the electrical vehicle is enabled to drive according to the operations of the motors 402a and 402b.

The hybrid vehicle may be driven not only by a driving force generated in the motors 402a and 402b but also by a driving force generated in the engine 407, as mentioned above. In this case, the driving of the hybrid vehicle is realized by switching mechanical connections from the drive axis 403a to the motor 402b and the engine 407 by the power dividing mechanism 408.

Note that the inverter module 401a and the motor 402b are put under control of the current application control unit 411 to establish the synchronous motor drive system described in the first embodiment. Similarly, the inverter module 401b and the motor 402b are put under control of the current application control unit 411 to establish the synchronous motor drive system described in the first embodiment.

In the hybrid electrical vehicle mounted with the synchronous motor drive system of the present invention, similarly to the electrical vehicle, the following effect is achieved. That is to say, compared with hybrid electrical vehicles using a plurality of motors and inverters, the cost is reduced while reliability is improved.

Second Modification of the Fourth Embodiment

Figure 30:
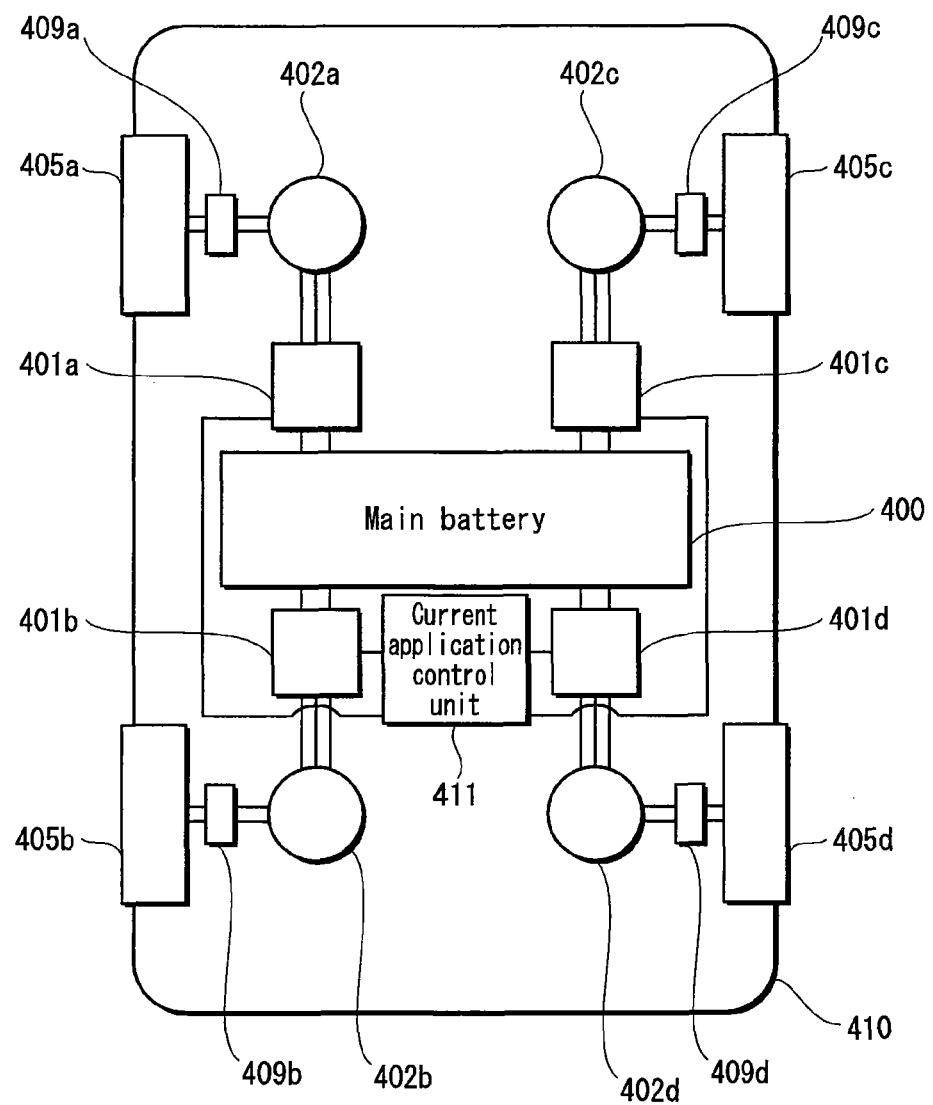
FIG. 30 shows an overall structure of an in-wheel motor electrical vehicle mounted with the synchronous motor drive system of the present invention.

Next, a description is given of another modification in which the synchronous motor drive system of the present invention is mounted on an in-wheel motor electrical vehicle. FIG. 30 shows an overall structure of the in-wheel motor electrical vehicle mounted with the synchronous motor drive system of the present invention.

The major part of the in-wheel electrical vehicle pertaining to the present embodiment is mainly composed of a main battery 400, inverter modules 401a to 401d, motors 402a to 402d, gears 409a to 409d, and wheels 405a to 405d.

The inverter modules 401a, 401b, 401c, and 401d each have three three-phase inverters inside. AC power output from the main buttery 400 is DC/AC converted by the inverter modules 401a, 401b, 401c, and 401d and input to the motors 402a, 402b, 402c, and 402d as DC power. The motors 402a to 402d each convert the electrical energies supplied from the inverter modules 401a to 401d to mechanical energies to generate driving power. Each motor is connected to a wheel via a gear. Accordingly, the rotating drive of each motor causes a wheel at a rotation speed reduced by a gear. In this way, the in-wheel motor electrical vehicle is enabled to drive according to the operations of each motor.

Note that each connected pair of one of the inverter modules 401a to 401d and one of the motors 402a to 402d is put under control of the current application control unit 411. As a result, four synchronous motor drive systems described in the first embodiment are established.

Generally, in-wheel motor electrical vehicles have the following advantage, for example. An improved driving performance is realized which was not obtained from conventional vehicle systems. However, there is also a disadvantage. Since wheels are separately driven, if a system for driving any one of the wheels goes out of order, the vehicle goes uncontrollable. As a result, a driver might face danger. On the other hand, in the in-wheel motor electrical vehicle mounted with the synchronous motor drive system of the present invention, even if one of the three three-phase inverters goes out of order, the remaining inverters still continue to drive the motor to rotate. Accordingly, the in-wheel electrical vehicle of the present embodiment is enabled to maintain the driving without interruption. Further, of occurrence of overload is detected in one of the three three-phase inverters included in a inverter module, the current application control unit 411 may perform control. The control is made to halt the operation of the overloaded three-phase inverter, while compensating the shortage of the driving force resulting from the halt operation by the remaining three-phase inverters.

Accordingly, by mounting the synchronous motor drive system of the present invention, the highly reliable in-wheel electrical motor vehicle is provided.

In addition, although the synchronous motor drive system described in the first embodiment is used in the present embodiment and the modifications as the synchronous motor drive systems of electrical vehicles, the present embodiment is not limited to this. The structures described in other embodiments and modifications may be used as the synchronous motor drive systems of electrical vehicles.

Other Modifications

Although the synchronous motor drive systems of the present invention has been described in conjunction with the embodiments, the present invention is not limited to these embodiments. For example, the following modifications may be implemented.

(1) In the embodiments, the descriptions are made of the structure in which two or three inverters are included. However, the present invention is applicable to any synchronous motor drive system including two or more inverters. Such a structure also allows achieving the similar effect.

(2) In the embodiments, the descriptions are made of outer-rotor type synchronous motors in which a rotor is disposed outside a stator. However, of course other types of synchronous motors also bring about the same effect. These are, for example, inner-rotor type synchronous motors in which a rotor is disposed inside a stator, so-called axial gap type synchronous motors in which a stator is axially facing a rotor with an axial air gap therebetween, and synchronous motors in which these two types are combined.

(3) In the embodiments, the descriptions are made of interior permanent magnet (IPM) motors. However, of course the same effect may also be achieved by surface permanent magnet (SPM) motors, or reluctance motors that do not employ permanent magnet rotors.

(4) The present invention is able to provide a synchronous motor drive system of compact size, high output, low vibration, low noise, and improved efficiency. Accordingly, the present invention is particularly useful in application for vehicles, as they require reduced vibration and noise.

(5) Any of the above-described first, second, third embodiments and modifications may be combined.

INDUSTRIAL APPLICABILITY

The present invention is applicable to synchronous motor drive systems for compressors, electrical vehicles, hybrid vehicles, fuel-cell vehicles, and the like, as these synchronous motors require compact size, improved efficiency, and reduced vibration noise.

REFERENCE SIGNS LIST

1 AC power supply
2 rotor
4 rotor core
5 permanent magnet
6 magnetic pole
9 stator coil
10 point between magnetic poles
11 point between magnetic poles
21a to 21c coil terminal
22a to 22c coil terminal
23a to 23c coil terminal
24a to 24c coil terminal
31a to 31c coil terminal
32a to 32c coil terminal
33a to 33c coil terminal
34a to 34c coil terminal
35a to 35c coil terminal
36a to 36c coil terminal
41 synchronous motor
42 synchronous motor
43 stator
44 synchronous motor
47 stator teeth
48 stator teeth group
48a to 48c stator teeth group
51 position detector
52 current application control unit
53 current application control unit
54 position detector
55 current application control unit
61a to 64a stator tooth
71a to 73a stator tooth
81a stator coil
82a stator coil
83a stator coil
91a stator coil
92a stator coil
93a stator coil
100 inverter module
101 to 103 inverter
104 inverter module
105, 106 inverter
200a to 200e coil group
203a to 203c coil group
301a, 301c current detector
302a, 302c current detector
303a, 303c current detector
400 main buttery
401a to 401d inverter module
402a to 402d motor
403a, 403b drive axis
404a, 404d differential gear
405a to 405d wheel
406 auxiliary buttery
407 engine
408 power dividing mechanism
409a to 409d gear
410 in-wheel motor electrical vehicle
411 current application control unit

The invention claimed is:

1. A synchronous motor drive system, comprising:
three-phase inverters each operable to convert a direct current to a three-phase alternating current;
a current application control unit operable to control operations of the three-phase inverters; and
a synchronous motor operable to drive by the three-phase alternating currents supplied from the three-phase inverters, wherein
the synchronous motor includes:
three-phase coil groups each supplied with a three-phase alternating current from one of the inverters;
a rotor that has magnetic poles distributed circumferentially along a rotation direction of the rotor at equal intervals; and
a stator on which stator coils are arranged circumferentially along the rotation direction of the rotor, each stator coil wound by concentrated winding and belonging to one of the three-phase coil groups, wherein every M consecutive stator coils belong to one of stator coil groups arranged at equal intervals, M being an integer two or greater, at least two consecutive stator coils in each stator coil group are arranged at an interval different from the intervals of the magnetic poles of the rotor and belong to different three-phase coil groups, the current application control unit determines, for each three-phase inverter, a current phase angle and a current amount of a three-phase alternating current to output so as to control at least one of the three-phase inverters to operate in a first current application mode and control at least another one of the three-phase inverters to operate in a second current application mode, the first current application mode being a mode in which the three-phase inverters generate a three-phase alternating current having a sinusoidal waveform, the second current application mode being a mode in which the three-phase inverters generate a three-phase alternating current having a step waveform with polarity alternating before and after part of a period of $2\pi$ electric radians, supply the three-phase alternating current except during the part, and do not supply the three-phase alternating current during the part, and each inverter supplies a three-phase alternating current having the determined current phase angle and current amount to a different one of the three-phase coil groups.

2. The synchronous motor drive system of claim 1, wherein the current application control unit determines, for at least two of the three-phase inverters, different current phase angles and then the current amounts according to the determined current phase angles, so as to equalize torque amounts generated in three-phase coil groups corresponding to the at least two inverters.

3. The synchronous motor drive system of claim 1, further comprising:

a position detector operable to (i) measure line voltages in at least one of the three-phase coil groups in part of the period in which no current is supplied from the inverters operating in the second current application mode, the line voltages being induced in the three-phase coil groups by rotation of the rotor and (ii) detect a position of the rotor with use of the measured line voltages, wherein the current control application unit controls the inverters according to the detected position of the rotor.

4. The synchronous motor drive system of claim 1, wherein the current control application unit switches the operations of the at least two three-phase inverters from the second current application mode to the first current application mode in accordance with driving condition of the synchronous motor.

5. The synchronous motor drive system of claim 1, wherein a plurality of switching devices constituting the three-phase inverters are packaged in a single module.

6. The synchronous motor drive system of claim 5, wherein each switching device is a wide band gap semiconductor comprising a material selected from a group consisting of silicon carbide and gallium nitride.

7. The synchronous motor drive system of claim 1, wherein differences between the three-phase inverters in the current phase angle are variable as determined by the current application control unit.

8. The synchronous motor drive system of claim 1, wherein the current application control unit performs the determination separately for each three-phase inverter when executing flux weakening control.

9. The synchronous motor drive system of claim 1, wherein the current application control unit performs the determination separately for each three-phase inverter in a case of driving at a high rotation speed, the high rotation speed being a speed at which induced field voltage generated in the three-phase coil groups under influence of magnetic fields of the magnetic poles is greater than or equal to a voltage of a direct current power supply.

10. The synchronous motor drive system of claim 1, wherein the current application control unit performs the determination separately for each three-phase inverter in a case of driving at a high rotation speed, the high rotation speed being a speed at which induced field voltage generated in the three-phase coil groups is greater than or equal to a voltage of a direct current power supply.

11. The synchronous motor drive system of claim 1, wherein the current application control unit (i) holds a map data table indicating torque amounts in the synchronous motor in correspondence with various three-phase alternating currents, each three-phase alternating current being indicated by a current phase angle and a current amount, and (ii) performs the determination based on the map data table so that torque amounts generated by the three-phase alternating currents supplied from the three-phase inverters are equalized.

12. The synchronous motor drive system of claim 1, wherein the at least two consecutive stator coils among the stator coils have inductance values different from each other, and the current application control unit performs the determination for each of at least two three-phase inverters corresponding to three-phase coil groups to which the at least two consecutive stator coils belong, according to the corresponding inductance value.

13. The synchronous motor drive system of claim 12, wherein the current application control unit calculates the inductance values based on change rates of three-phase alternating currents respectively supplied from the at least two three-phase inverters.

14. The synchronous motor drive system of claim 1, wherein the at least two consecutive stator coils among the stator coils have numbers of turns different from each other, and the current application control unit performs the determination for each of at least two three-phase inverters corresponding to three-phase coil groups to which the at least two consecutive stator coils belong, according to the corresponding number of turns.

15. The synchronous motor drive system of claim 1, wherein the current application control unit (i) includes a detector for detecting a load state of each three-phase inverter and (ii) halts an operation of an inverter that has been detected to be in an overload state by the detector.

16. The synchronous motor drive system of claim 1, wherein in a case that an operation of at least one of the three-phase inverters is halted, the current application control unit controls the other three-phase inverters so that torque to be generated by a three-phase coil group corresponding to the at least one inverter is generated by the other three-phase coil groups instead.

17. The synchronous motor drive system of claim 1, wherein
in a case that an operation of at least one of the three-phase inverters is halted, the current application control unit also controls the other three-phase inverters to halt operations.

18. A vehicle that includes the synchronous motor drive system of claim 1.

19. An electrical vehicle that includes the synchronous motor drive system of claim 1.

20. A hybrid electrical vehicle that includes the synchronous motor drive system of claim 1.

21. An in-wheel motor electrical vehicle that includes the synchronous motor drive system of claim 1.

22. A synchronous motor drive system, comprising:
three-phase inverters each operable to convert a direct current to a three-phase alternating current;
a current application control unit operable to control operations of the three-phase inverters; and
a synchronous motor operable to drive by three-phase alternating currents supplied from the three-phase inverters, wherein
the synchronous motor includes:
three-phase coil groups each supplied with a three-phase alternating current from one of the inverters;
a rotor that has magnetic poles distributed circumferentially along a rotation direction of the rotor at equal intervals; and
a stator that has stator teeth arranged circumferentially along the rotation direction of the rotor, and
every M consecutive stator teeth belong to one of stator teeth groups arranged at equal intervals, M being an integer three or greater,
at least two of consecutive first, Second and third stator teeth in each stator teeth group are arranged at an interval different from the intervals of the magnetic poles of the rotor,
the first stator tooth is wound with part of a first stator coil,
the third stator tooth is wound with part of a second stator coil,
the second stator tooth is wound with a remaining part of the first stator coil and a remaining part of the second stator coil, and
the first and second stator coils belong to different three-phase coil groups, wherein
the current application control unit determines, for each three-phase inverter, a current phase angle and a current amount of a three-phase alternating current to output, and
each inverter supplies a three-phase alternating current having the determined current phase angle and current amount to a different one of the three-phase coil groups.

23. The synchronous motor drive system of claim 22, wherein
the current application control unit determines, for at least two of the three-phase inverters, different current phase angles and then the current amounts according to the determined current phase angles, so as to equalize torque amounts generated in three-phase coil groups corresponding to the at least two inverters.

24. The synchronous motor drive system of claim 22, wherein the current application control unit controls:
at least one of the three-phase inverters to operate in a first current application mode in which a current is supplied throughout a period of $2\pi$ electric radians; and
at least two of the three-phase inverters to operate in a second current application mode in which a current is supplied only in part of the period of $2\pi$ electric radians.

25. The synchronous motor drive system of claim 24, wherein
a position detector operable to (i) measure line voltages in at least one of the three-phase coil groups in part of the period in which no current is supplied from the inverters operating in the second current application mode, the line voltages being induced in the three-phase coil groups by rotation of the rotor and (ii) detect a position of the rotor with use of the measured line voltages, wherein
the current control application unit controls the inverters according to the detected position of the rotor.

26. The synchronous motor drive system of claim 24, wherein
the current control application unit switches the operations of the at least two three-phase inverters from the second current application mode to the first current application mode in accordance with driving condition of the synchronous motor.

27. The synchronous motor drive system of claim 22, wherein
a plurality of switching devices constituting the three-phase inverters are packaged in a single module.

28. The synchronous motor drive system of claim 27, wherein
each switching device is a wide band gap semiconductor comprising a material selected from a group consisting of silicon carbide and gallium nitride.

29. The synchronous motor drive system of claim 22, wherein
differences between the three-phase inverters in the current phase angle are variable as determined by the current application control unit.

30. The synchronous motor drive system of claim 22, wherein
the current application control unit performs the determination separately for each three-phase inverter when executing flux weakening control.

31. The synchronous motor drive system of claim 22, wherein
the current application control unit performs the determination separately for each three-phase inverter in a case of driving at a high rotation speed, the high rotation speed being a speed at which induced field voltage generated in the three-phase coil groups under influence of magnetic fields of the magnetic poles is greater than or equal to a voltage of a direct current power supply.

32. The synchronous motor drive system of claim 22, wherein
the current application control unit performs the determination separately for each three-phase inverter in a case of driving at a high rotation speed, the high rotation speed being a speed at which induced field voltage generated in the three-phase coil groups is greater than or equal to a voltage of a direct current power supply.

33. The synchronous drive system of claim 22, wherein
the current application control unit holds a map data table indicating torque amounts of the synchronous motor in correspondence with various three-phase alternating currents, each three-phase alternating current being indicated by a current phase angle and a current amount, and (ii) performs the determination based on the map data table so that torque amounts generated by the three-phase alternating currents supplied from the three-phase inverters are equalized.

34. The synchronous motor drive system of claim 22, wherein
the first and second stator coils have inductance values different from each other, and
the current application control unit performs the determination for each of two three-phase inverters corresponding to the three-phase coil groups to which the first and second stator oils belong, according to the corresponding inductance value.

35. The synchronous motor drive system of claim 34, wherein
the current application control unit calculates the inductance values of the first and second stator coils based on change rates of three-phase alternating currents respectively supplied from the two three-phase inverters.

36. The synchronous motor drive system of claim 22, wherein
the first and second stator coils have numbers of turns different from each other, and
the current application control unit performs the determination for each of two three-phase inverters corresponding to the three-phase coil groups to which the first and second stator coils belong, according to the corresponding number of turns.

37. The synchronous motor drive system of claim 22, wherein
the current application control unit (i) includes a detector for detecting a load state of each three-phase inverter and (ii) halts an operation of an inverter that has been detected to be in an overload state by the detector.

38. The synchronous motor drive system of claim 22, wherein
in a case that an operation of at least one of the three-phase inverters is halted, the current application control unit controls the other three-phase inverters so that torque to be generated by a three-phase coil group corresponding to the at least one inverter is generated by the other three-phase coil groups instead.

39. The synchronous motor drive system of claim 22, wherein
in a case that an operation of at least one of the three-phase inverters is halted, the current application control unit also controls the other three-phase inverters to halt operations.

40. A vehicle that includes the synchronous motor drive system of claim 22.

41. An electric vehicle that includes the synchronous motor drive system of claim 22.

42. A hybrid electric vehicle that includes the synchronous motor drive system of claim 22.

43. An in-wheel motor electric vehicle that includes the synchronous motor drive system of claim 22.

44. A synchronous motor drive system, comprising:
three-phase inverters each operable to convert a direct current to a three-phase alternating current;
a current application control unit operable to control operations of the three-phase inverters; and
a synchronous motor operable to drive by the three-phase alternating currents supplied from the three-phase inverters, wherein
the synchronous motor includes:
three-phase coil groups each supplied with a three-phase alternating current from one of the inverters;
a rotor that has magnetic poles distributed circumferentially along a rotation direction of the rotor at equal intervals; and
a stator on which stator coils are arranged circumferentially along the rotation direction of the rotor, each stator coil wound by concentrated winding and belonging to one of the three-phase coil groups, wherein
every M consecutive stator coils belong to one of stator coil groups arranged at equal intervals, M being an integer two or greater,
at least two consecutive stator coils in each stator coil group are arranged at an interval different from the intervals of the magnetic poles of the rotor and belong to different three-phase coil groups,
the current application control unit determines, for each three-phase inverter, a current phase angle and a current amount of a three-phase alternating current to output, and
each inverter supplies a three-phase alternating current having the determined current phase angle and current amount to a different one of the three-phase coil groups,
wherein the current application control unit (i) holds a map data table indicating torque amounts in the synchronous motor in correspondence with various three-phase alternating currents, each three-phase alternating current being indicated by a current phase angle and a current amount, and (ii) performs the determination based on the map data table so that torque amounts generated by the three-phase alternating currents supplied from the three-phase inverters are equalized.

45. An electrical vehicle that includes the synchronous motor drive system of claim 44.

* * * * *